US009806853B2

(12) United States Patent
Jeong et al.

(10) Patent No.: US 9,806,853 B2
(45) Date of Patent: *Oct. 31, 2017

(54) METHOD AND APPARATUS FOR TRANSMITTING AND RECEIVING CONTROL INFORMATION IN A BROADCASTING/COMMUNICATION SYSTEM

(71) Applicant: Samsung Electronics Co., Ltd., Gyeonggi-do (KR)

(72) Inventors: Hong-Sil Jeong, Seoul (KR); Ismael Gutierrez, Middlesex (GB); Alain Mourad, Middlesex (GB); Sung-Ryul Yun, Gyeonggi-do (KR); Hyun-Koo Yang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 245 days.

This patent is subject to a terminal disclaimer.

(21) Appl. No.: 14/642,155

(22) Filed: Mar. 9, 2015

(65) Prior Publication Data
US 2015/0180612 A1 Jun. 25, 2015

Related U.S. Application Data

(63) Continuation of application No. 13/430,119, filed on Mar. 26, 2012, now Pat. No. 8,976,902.

(30) Foreign Application Priority Data

Mar. 25, 2011 (KR) ........................ 10-2011-0027239
Jan. 18, 2012 (KR) ........................ 10-2012-0005947

(51) Int. Cl.
H04L 1/00 (2006.01)
(52) U.S. Cl.
CPC .......... H04L 1/0057 (2013.01); H04L 1/0072 (2013.01)

(58) Field of Classification Search
CPC ... H04L 1/0057; H04L 1/0041; H04L 1/0079; H04L 27/2626; H04L 27/38;
(Continued)

(56) References Cited

U.S. PATENT DOCUMENTS 7,346,835 B1 3/2008 Lobinger et al.
2003/0067920 A1 4/2003 Rezaiifar et al.
(Continued)

FOREIGN PATENT DOCUMENTS

CN 101330346 12/2008
EP 2 099 149 9/2009
(Continued)

OTHER PUBLICATIONS

Digital Video Broadcasting (DVB); Frame Structure Channel Coding and Modulation for a Second Generation Digital Transmission System for Cable Systems (DVB-C2), ETSI EN 3020 769 V1.2.1, Apr. 2011, 23 pages.
(Continued)

Primary Examiner — Vineeta Panwalkar
(74) Attorney, Agent, or Firm — The Farrell Law Firm, P.C.

(57) ABSTRACT

A method and an apparatus for encoding, transmitting, and receiving signaling information in a broadcasting/communication system are provided. The method includes generating the signaling information which comprises a plurality of pieces; determining a number of coded blocks to which the signaling information is to be encoded, based on a number of bits of the signaling information and a number of encoder input information bit; segmenting each piece of the signaling information based on the number of the coded blocks; constructing input information bits of each coded block to include segmented parts of each piece of the
(Continued)

signaling information; encoding the input information bits to each coded block; and transmitting each coded block.

32 Claims, 10 Drawing Sheets

(58) Field of Classification Search
CPC ............ H04L 1/0072; H03M 13/6552; H04N 21/6112; H04N 5/38; H04N 21/4382; H04N 21/615; H04N 5/455
USPC ......... 375/259, 295, 316; 370/522, 464, 498
See application file for complete search history.

(56) References Cited

U.S. PATENT DOCUMENTS

| | | |
|---|---|---|
| 2003/0123409 A1 | 7/2003 | Kwak et al. |
| 2003/0226089 A1 | 12/2003 | Rasmussen et al. |
| 2004/0013089 A1 | 1/2004 | Taneja et al. |
| 2008/0025267 A1* | 1/2008 | Wei .................. H04L 1/0025 370/337 |
| 2008/0313522 A1 | 12/2008 | Kim et al. |
| 2009/0290550 A1* | 11/2009 | Bhattad ............. H04W 72/0406 370/329 |
| 2010/0034219 A1 | 2/2010 | Stadelmeier et al. |
| 2010/0085985 A1 | 4/2010 | Pekonen et al. |
| 2010/0086087 A1 | 4/2010 | Pekonen et al. |
| 2010/0226426 A1 | 9/2010 | Tupala et al. |

FOREIGN PATENT DOCUMENTS

| | | |
|---|---|---|
| JP | 5670537 | 2/2015 |
| KR | 1020090094738 | 9/2009 |
| RU | 2 249 923 | 4/2005 |
| RU | 2 364 039 | 8/2009 |
| WO | WO 2008/048188 | 4/2008 |
| WO | WO 2009/110739 | 9/2009 |
| WO | WO 2010/038134 | 4/2010 |
| WO | WO 2010/104359 | 9/2010 |

OTHER PUBLICATIONS

Japanese Office Action dated Nov. 2, 2015 issued in counterpart application No. 2014-501012, 7 pages.
Chinese Office Action dated Dec. 21, 2015 issued in counterpart application No. 201280015231.9, 13 pages.
Russian Office Action dated Apr. 20, 2016 issued in counterpart application No. 2013147636/08, 37 pages.
Korean Office Action dated Apr. 26, 2016 issued in counterpart application No. 10-2012-0005947, 9 pages.

* cited by examiner

METHOD AND APPARATUS FOR TRANSMITTING AND RECEIVING CONTROL INFORMATION IN A BROADCASTING/COMMUNICATION SYSTEM

PRIORITY

This application is a continuation of U.S. patent application Ser. No. 13/430,119, now U.S. Pat. No. 8,976,902, which was filed on Mar. 26, 2012 and claims priority under 35 U.S.C. §119(a) to Korean Patent Application Serial No. 10-2011-0027239, which was filed in the Korean Intellectual Property Office on Mar. 25, 2011, and a Korean Patent Application Serial No. 10-2012-0005947, which was filed in the Korean Intellectual Property Office on Jan. 18, 2012, the content of each of which is incorporated herein by reference.

BACKGROUND OF THE INVENTION

1. Field of the Invention

The present invention relates generally to a method and an apparatus for transmitting and receiving control information in a broadcasting/communication system, and more particularly, to a method and an apparatus for transmitting and receiving the control information in the broadcasting/communication system using a Low Density Parity Check (LDPC) code.

2. Description of the Related Art

FIG. 1 illustrates a frame used in a conventional broadcasting/communication system.

Referring to FIG. 1, a frame 101 including control information is transmitted and received in a broadcasting/communication system. The frame 101 includes a preamble 102, Layer 1 (L1) signaling 103, and data 104. Herein, the control information can be transmitted in the preamble 102 and the L1 signaling 103. The preamble 102 is a signal used to acquire time and frequency synchronization, frame boundary synchronization, etc., of a receiver.

As illustrated in FIG. 1, the data 104 includes Physical Layer Pipes (PLPs) 108, 109, and 110. Different modulation schemes and code rates can be independently used for PLPs, respectively.

The L1 signaling 103 indicates where an L1 signal is transmitted, and includes L1-pre information 105, L1 configurable information 106, and L1 dynamic information 107. The L1 configurable information 106 and the L1 dynamic information 107 are referred to as L1-post signaling information 120. Also, the L1 configurable information 106 may be referred to as configurable L1-post signaling, and the L1 dynamic information 107 may be referred to as dynamic L1-post signaling.

The L1-pre information 105 includes information that rarely changes in the time domain, such as a cell identifier, a network identifier, the number of radio frequencies, the length of frames, and the position of a pilot subcarrier. The L1 configurable information 106 includes information that changes more often than the L1-pre information 105. Examples of the L1 configurable information 106 include a PLP identifier, a modulation scheme employed to transmit each PLP, and code rate information.

In FIG. 1, the L1 dynamic information 107 includes information that may change in each frame, such as information on a position at which each PLP transmitting service data is transmitted in a current frame (i.e., information on positions at which each PLP transmitting service data starts and ends in a current frame).

Additionally, the L1-post signaling information 120 may include information other than the L1 post configurable information 106 and the dynamic information 107. For example, the L1-post signaling information 120 may include extension information, a Cyclic Redundancy Check (CRC), which is an error check code, and L1 padding. For example, use of the CRC has been described in "Peterson, W. W. and Brown, D. T. (January 1961). "Cyclic Codes for Error Detection" Proceedings of the IRE 49: 228. doi:10.1109/JRPROC.1961.287814."

The PLP 1 108, the PLP 2 109, and the PLP N 110 are service data, each of which transmits at least one broadcasting service channel. The PLP 1 108, the PLP 2 109, and the PLP N 110 include the actual broadcast data.

Referring to FIG. 1, a receiver that has acquired synchronization of the frame 101 through the preamble 102, obtains information including a scheme in which data is transmitted, the length of frames, etc., through the L1 signaling information 103. The receiver then receives the relevant data through the PLPs 108 to 110 based on the obtained information.

As described above, when control information such as signaling information is transmitted in the broadcasting/communication system, the performance of encoding of the control information must be better than the performance of encoding of data information. Therefore, there is a need for an efficient encoding method of the signaling information and an efficient decoding method thereof.

SUMMARY OF THE INVENTION

Accordingly, the present invention has been designed to address at least the above-described problems occurring in the prior art, and to provide at least the following advantages.

An aspect of the present invention is to provide an encoding method that increases performance of decoding of control information.

Another aspect of the present invention is to provide an encoding method for increasing performance of decoding of L1-post signaling information.

Another aspect of the present invention is to provide a method and an apparatus for transmitting and receiving control information in a broadcasting/communication system.

In accordance with an aspect of the present invention, a method for transmitting signaling information in a broadcasting/communication system is provided. The method includes generating the signaling information which comprises a plurality of pieces; determining a number of coded blocks to which the signaling information is to be encoded, based on a number of bits of the signaling information and a number of encoder input information bits; segmenting each piece of the signaling information based on the number of the coded blocks; constructing input information bits of each coded block to include segmented parts of each piece of the signaling information; encoding the input information bits to each coded block; and transmitting each coded block.

In accordance with another aspect of the present invention, a method for receiving signaling information in a broadcasting/communication system is provided. The method includes receiving coded blocks of the signaling information; acquiring a number of bits of the signaling information or a number of the coded blocks of the signaling information; decoding the coded blocks; extracting segmented signaling information bits included in the decoded coded blocks; and restoring the extracted segmented signaling information bits to a state before being segmented.

In accordance with another aspect of the present invention, an apparatus for transmitting signaling information in a broadcasting/communication system is provided. The apparatus includes a layer 1 (L1) signaling information generator for generating the signaling information which comprises a plurality of pieces; a controller for determining a number of coded blocks to which the signaling information is to be encoded, based on a number of bits of the signaling information and a number of encoder input information bits; an encoder for segmenting each piece of the signaling information based on the number of the coded blocks, constructing input information bits of each coded block to include segmented parts of each piece of the signaling information, and encoding the input information bits to each coded block; and a transmitter for transmitting each encoded block.

In accordance with another aspect of the present invention, an apparatus for receiving signaling information in a broadcasting/communication system is provided. The apparatus includes a receiver for receiving coded blocks of the signaling information; a decoder for decoding the coded blocks; a controller for acquiring a number of bits of the signaling information or a number of the coded blocks of the signaling information, and extracting segmented signaling information bits included in the decoded coded blocks; and a reassembler for reassembling the segmented signaling information bits to a state before being segmented.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Various embodiments of the present invention will be described in detail below with reference to the accompanying drawings. In the following description and the accompanying drawings, a detailed description of publicly-known functions and configurations will be omitted to avoid unnecessarily obscuring the subject matter of the present invention.

Although embodiments of the present invention will be described below using LDPC encoding, the present invention is also applicable to other types of encoding.

Figure 2:
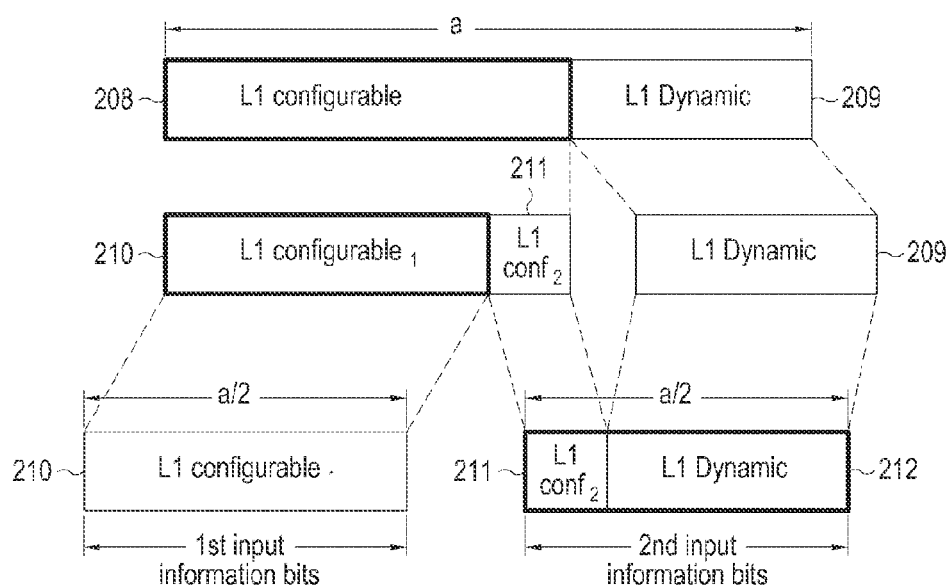
FIG. 2 illustrates conventional segmented control information in a broadcasting/communication system.

FIG. 2 illustrates conventional segmented control information in a broadcasting/communication system. Specifically, FIG. 2 illustrates encoding L1 configurable information 208 and L1 dynamic information 209 corresponding to the L1-post signaling information included in the L1 signaling information.

Referring to FIG. 2, because the L1 configurable information 208 includes information does not change in each frame, but may change sometimes, L1 configurable information in a $K^{th}$ frame may be identical to L1 configurable information in a $(K+1)^{th}$ frame. When the L1 configurable information included in the $K^{th}$ frame is identical to the L1 configurable information included in the $(K+1)^{th}$ frame, upon receiving the $(K+1)^{th}$ frame, a receiver may previously know L1 configurable information included in the $(K+1)^{th}$ frame through L1 configurable information included in the already-received $K^{th}$ frame. Therefore, the receiver can improve the performance of decoding of L1 dynamic information included in the $(K+1)^{th}$ frame by using the previously-known L1 configurable information.

More specifically, because the receiver receives the L1 configurable information included in the $K^{th}$ frame and the same L1 configurable information is transmitted in the $(K+1)^{th}$ frame, when the receiver decodes the $(K+1)^{th}$ frame, the receiver already knows the L1 configurable information included in the $(K+1)^{th}$.

Further, even when the receiver fails to decode the $K^{th}$ frame, the receiver can improve the performance of decoding of L1 configurable information and L1 dynamic information of the $(K+1)^{th}$ frame by using the L1 configurable information received in the $K^{th}$ frame. For example, when the L1 configurable information of the $K^{th}$ frame is identical to the L1 configurable information of the $(K+1)^{th}$ frame, the receiver may use an acquired Log Likelihood Ratio (LLR) value to decode the $(K+1)^{th}$ frame, even though the receiver fails to decode the L1 configurable information included in the $K^{th}$ frame.

When using an LDPC code, an encoder encodes only information bits, the number of which is smaller than a predetermined number of input information bits (an encoding unit; the number of input information bits corresponding to the input size of the encoder). Therefore, in an LDPC encoding scheme, when the number of input information bits is greater than a predetermined number of information bits, the input information bits are segmented. Herein, information input to an encoder is referred to as "input information bits," and a codeword that is output after encoding by the encoder is referred to as a "coded block."

Referring to FIG. 2, the L1 configurable information 208 and the L1 dynamic information 209, which have variable lengths and correspond to L1-post signaling information having a size of "a," are segmented into two coded blocks. When the number of bits of the L1-post signaling information is greater than a predetermined number of encoder information bits, the L1-post signaling information is segmented into two coded blocks. In this case, first input information bits 210 are generated by extracting an a/2 part from the L1-post signaling information, and second input information bits 212 are generated by extracting a remaining a/2 from the L1-post signaling information. The first input information bits 210 include L1 configurable information$_1$ (configurable$_1$) 210, which is a part of the L1 configurable information 208. Namely, the first input information bits 210 include only the L1 configurable information 208. Also, the second input information bits 212 include L1 configurable information$_2$ (L1 configurable$_2$) 211, which is a part of the L1 configurable information 208, and the L1 dynamic information (L1 dynamic) 209.

It is assumed that the L1 configurable information 208 included in the $K^{th}$ frame is identical to the L1 configurable information 208 included in the $(K+1)^{th}$ frame. Accordingly, when the receiver receives the $K^{th}$ frame and succeeds in decoding the L1 configurable information 208, there is an advantage in that the receiver then does not have to decode a first coded block including the first input information bits 210 in the $(K+1)^{th}$ frame. However, a second coded block including the second input information bits 212 includes only the L1 configurable information$_2$ (configurable$_2$) 211, which is a part of the L1 configurable information 208. Accordingly, although the receiver knows the L1 configurable information 208, the number of bits of the known information is not large enough for the receiver to significantly improve the performance of decoding of the L1 dynamic information 209.

In accordance with an embodiment of the present invention, L1 configurable information 208, as illustrated in FIG. 2, is included in each of the first input information bits and the second input information bits.

Additionally, in an LDPC encoding scheme, the decoding performance of information located at a front part of encoder input information bits is often better than the decoding performance of information located at a rear part of the encoder input information bits. Therefore, when the LDPC is used, in accordance with an embodiment of the present invention, it is desirable to locate L1 dynamic information, i.e., information that may change in each frame, at a front part of input information bits in order to improve decoding performance of the receiver.

Figure 3:
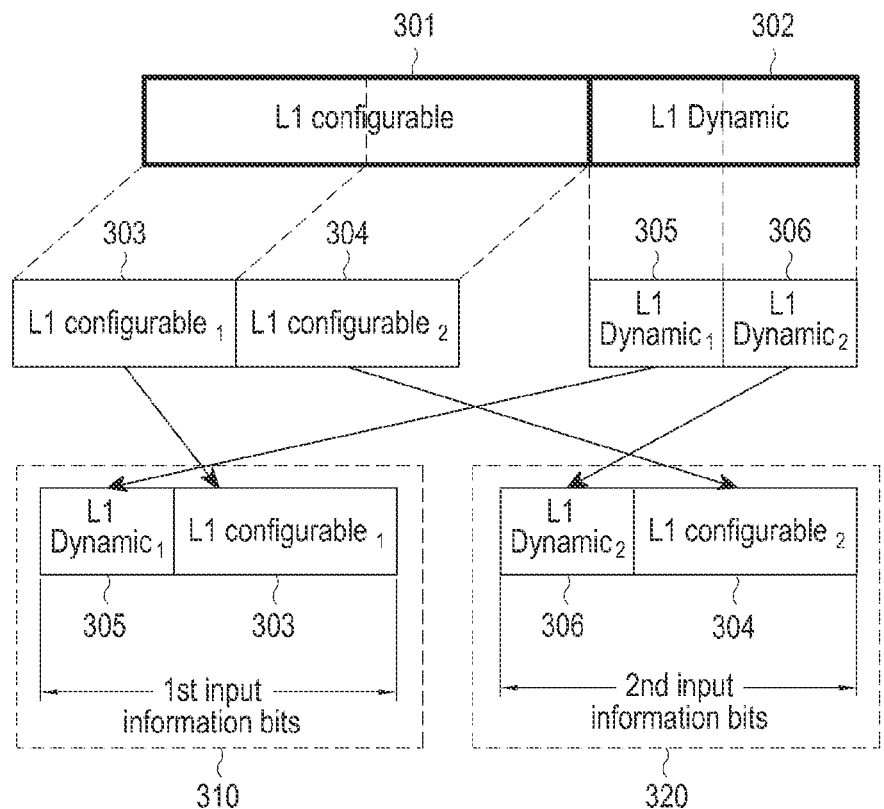
FIG. 3 illustrates a method for segmenting control information and generating encoder input information bits according to an embodiment of the present invention.

FIG. 3 illustrates a method for segmenting control information and generating encoder input information bits according to an embodiment of the present invention. Specifically, in FIG. 3, a segmentation value is equal to 2, which implies that L1 signaling information (particularly, L1-post signaling information) to be encoded is divided into first input information bits and second input information bits according to an encoding unit corresponding to the input size of the encoder, and the first input information bits and the second input information bits are input to the encoder. Therefore, when a segmentation value is equal to 2, input information bits encoded by the encoder are divided into two coded blocks, and then the two coded blocks are output from the encoder.

Referring to FIG. 3, L1 configurable information 301 is segmented into two parts, i.e., L1 configurable information$_1$ (L1 configurable$_1$) 303 and L1 configurable information$_2$ (L1 configurable$_2$) 304, according to the segmentation value 2. Additionally, L1 dynamic information 302 is also separated into two parts, i.e., L1 dynamic information$_1$ (L1 dynamic$_1$) 305 and L1 dynamic information$_2$ (L1 dynamic$_2$) 306, according to the segmentation value of 2.

Further, a transmitter constructs first encoder input information bits 310 from the separated L1 configurable information$_1$ (L1 configurable$_1$) 303 and the L1 dynamic information (L1 dynamic$_1$) 305, and constructs second encoder input information bits 320 from the L1 configurable information$_2$ (L1 configurable$_2$) 304 and the L1 dynamic information$_2$ (L1 dynamic$_2$) 306. The transmitter first inputs each of the first encoder input information bits 310 and the second encoder input information bits 320 to an LDPC encoder to generate two coded blocks. In the first input information bits 310, the L1 dynamic information 305 is arranged in front of the L1 configurable information$_1$ 303. Similarly, in the second input information bits 320, the L1 dynamic information$_2$ 306 is arranged in front of the L1 configurable information$_2$ 304.

Alternatively, the L1 dynamic information and L1 configurable information may exchange positions with each other. For example, the L1 configurable information$_1$ 303 may be arranged in front of the L1 dynamic information$_1$ 305, and the L1 configurable information$_2$ 304 may be arranged in front of the L1 dynamic information$_2$ 306.

Additionally, it is also possible to arrange the L1 dynamic information 302 in front of the L1 configurable information 301 even a when encoder input information bits are not segmented. Namely, even when the length of the L1-post signaling information is less than a predetermined number of the LDPC encoder information bits, and thus, segmenting the L1-post signaling information is not required, the L1 dynamic information 302 may still be arranged in front of the L1 configurable information 301.

Figure 4:
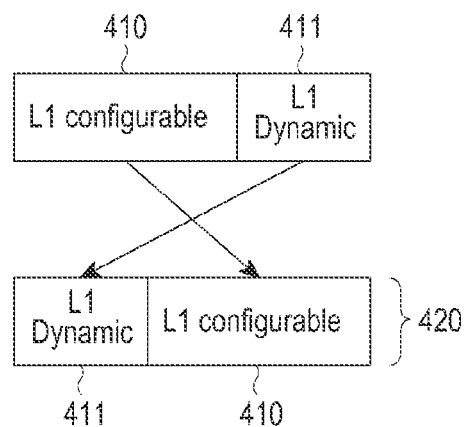
FIG. 4 illustrates a method for generating encoder input information bits without segmenting control information according to an embodiment of the present invention.

FIG. 4 illustrates a method for constructing LDPC encoder input information bits without segmenting L1-post signaling information according to an embodiment of the present invention.

Referring to FIG. 4, when LDPC encoder input information bits are constructed by including L1 configurable information 410 and L1 dynamic information 411, if the performance of decoding of bits located at a front part of the input information bits is better than the performance of decoding of bits located at a rear part of the input information bits, the input information bits are constructed by arranging the L1 dynamic information 411 in front of the L1 configurable information 410, as denoted by reference numeral 420.

Figure 5:
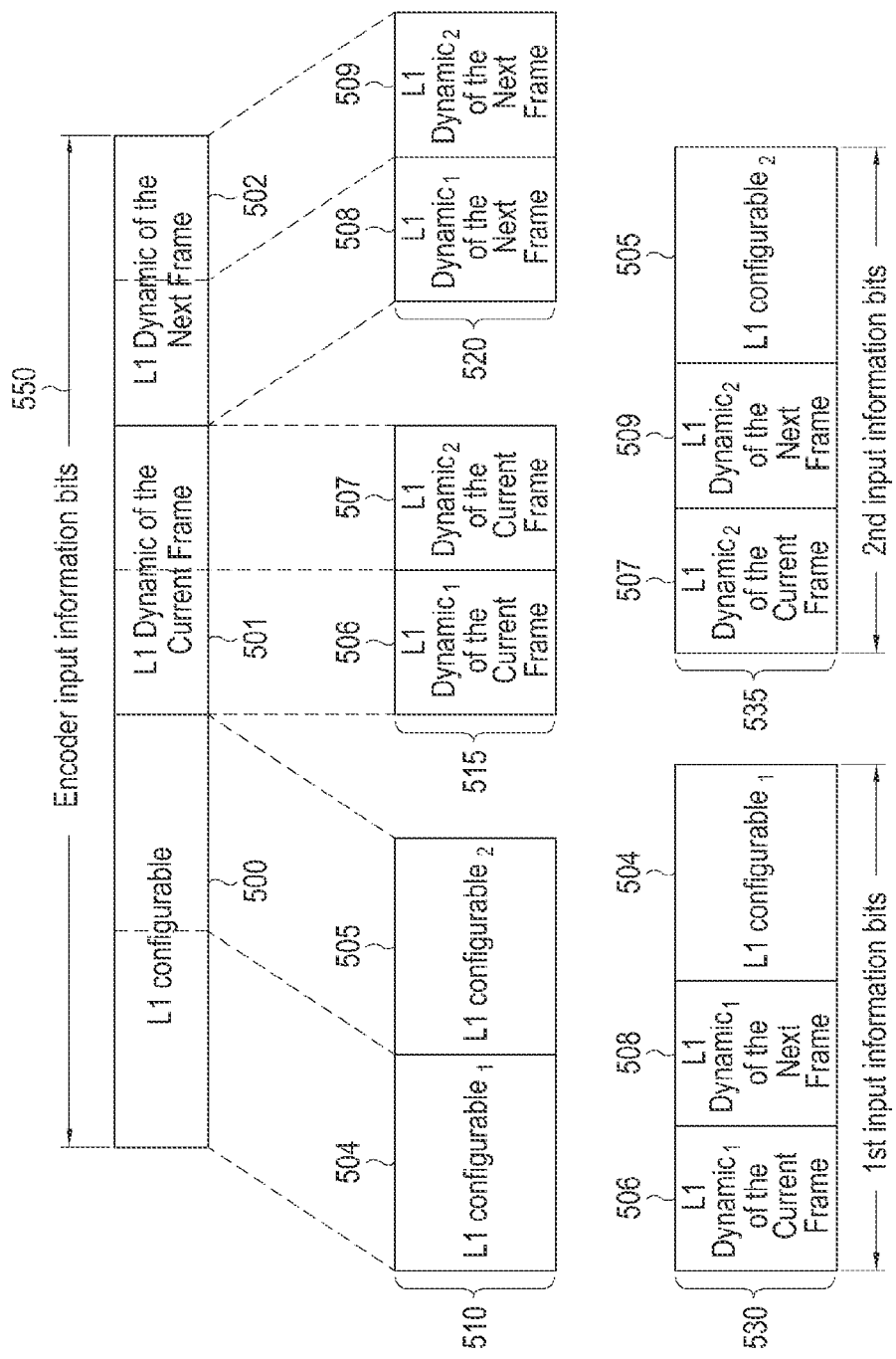
FIG. 5 illustrates a method for constructing input information bits input to an encoder according to an embodiment of the present invention.

FIG. 5 illustrates a method for constructing input information bits that are input to an encoder according to an embodiment of the present invention. Specifically, FIG. 5 illustrates that multiple pieces of control information included in L1-post signaling information are segmented according to a segmentation value of 2.

Referring to FIG. 5, L1-post signaling 550, which is input to the encoder, includes L1 configurable information 500, L1 dynamic information 500, L1 dynamic information of the current frame (or 'dynamic, current frame' or 'dynamic L-post signaling for the current frame') 501, and L1 dynamic information of a next frame (or 'dynamic, next frame' or 'dynamic L1-post signaling for the next frame') 502, which is L1 dynamic information of a frame to be subsequently transmitted. Specifically, when a current frame is a $K^{th}$ frame, the L1 dynamic information 502 of a next frame transmitted in the $K^{th}$ frame includes a value identical to L1 dynamic information to be transmitted in a $(K+1)^{th}$ frame. The L1 dynamic information 502 of the next frame is selective information, and a transmitter may notify a receiver whether there is L1 dynamic information for the next frame, through L1-pre signaling. For example, when a flag L1_REPETITION_FLG in L1-pre signaling has a value of 1, this indicates that there is L1 dynamic information for the next frame. However, when L1_REPETITION_FLG has a value of 0, this indicates that there is no L1 dynamic information for the next frame.

Each of the L1 configurable information 500, the L1 dynamic information of the current frame 501, and the L1 dynamic information of the next frame 502 is segmented into 2 parts. Specifically, the L1 configurable information 500 is divided into L1 configurable information$_1$ (L1 configurable$_1$) 504 and L1 configurable information$_2$ (L1 configurable$_2$) 505, as denoted by reference numeral 510. The L1 dynamic information of the current frame 501 is divided into L1 dynamic information$_1$ of the current frame (L1 dynamic$_1$ of the Current Frame) 506 and L1 dynamic information$_2$ of the current frame (L1 dynamic$_2$ of the Current Frame) 507, as denoted by reference numeral 515. The L1 dynamic information of the next frame 502 is divided into L1 dynamic information$_1$ of the next frame (L1 dynamic$_1$ of the Next Frame) 508 and L1 dynamic information, of the next frame (L1 dynamic$_2$ of the Current Frame) 509, as denoted by reference numeral 520.

During encoding, the L1 configurable information$_1$ 504, the L1 dynamic information$_1$ of the current frame 506, and the L1 dynamic information$_1$ of the next frame 508 are constructed as first input information bits 530. Further, the L1 configurable information$_2$ 505, the L1 dynamic information$_2$ of the current frame 507, and the L1 dynamic information$_2$ of the next frame 509 are constructed as second input information bits 535.

The L1 configurable information$_1$ 504 is arranged at the last part of the first input information bits 530, after the L1 dynamic information$_1$ of the current frame 506 and the L1 dynamic information$_1$ of the next frame 508.

Similarly, the L1 configurable information$_2$ 505 is located at the last part of the second input information bits 535, after the L1 dynamic information$_2$ of the current frame 507 and the L1 dynamic information$_2$ of the next frame 509.

The construction the first input information bits 530 and the second input information bits 535, as described above, is based decoding performance of bits located at the front part of the information bits being better, like in LDPC encoding. Accordingly, the actual positioning of the L1 configurable information 500, the L1 dynamic information of the current frame 501, and the L1 dynamic information of a next frame 502 in the first input information bits 530 and the second input information bits 535 may vary depending decoding performance, e.g., based on the type of encoding used.

Also, as described above with reference to FIG. 4, even when segmentation is not required, in consideration of decoding performance of bits located at the front part of input information bits being better when the LDPC encoding scheme is used, L1 dynamic information of the current frame may be located at the front most part of input information bits, and L1 configurable information may be located at the last part of the input information bits.

Therefore, regardless of whether segmentation is applied, the positioning of the L1 dynamic information and the L1 configurable information may be determined in consideration of encoding performance of the input information bits by the LDPC encoder. Namely, as described above, when the decoding performance of bits located at a rear part of input information bits is better than decoding performance of bits located at a front part of the input information bits, the L1 configurable information may be arranged at a front part of the input information bits, the input information bits, and the L1 dynamic information may be arranged a rear part of the input information bits.

Additionally, the L1 configurable information and the L1 dynamic information may be encoded/decoded independently of each other. Specifically, when the L1 dynamic information includes L1 dynamic information of the current frame and L1 dynamic information of the next frame, as described above, each of optional dynamic information of the current frame and the L1 dynamic information of the next frame is segmented, and first input information bits corresponding to a unit, which is input to the encoder, is constructed from the segmented L1 dynamic information$_1$ of the current frame and the segmented L1 dynamic information$_1$ of the next frame. Also, second input information bits corresponding to a unit, which is input to the encoder, is constructed from the segmented L1 dynamic information$_2$ of the current frame and the segmented L1 dynamic information$_2$ of the next frame. Further, regardless of whether segmentation is required, the L1 dynamic information of the current frame is arranged at a front part of input information bits, and the L1 dynamic information of the next frame is arranged at a rear part of the input information bits.

Figure 6:
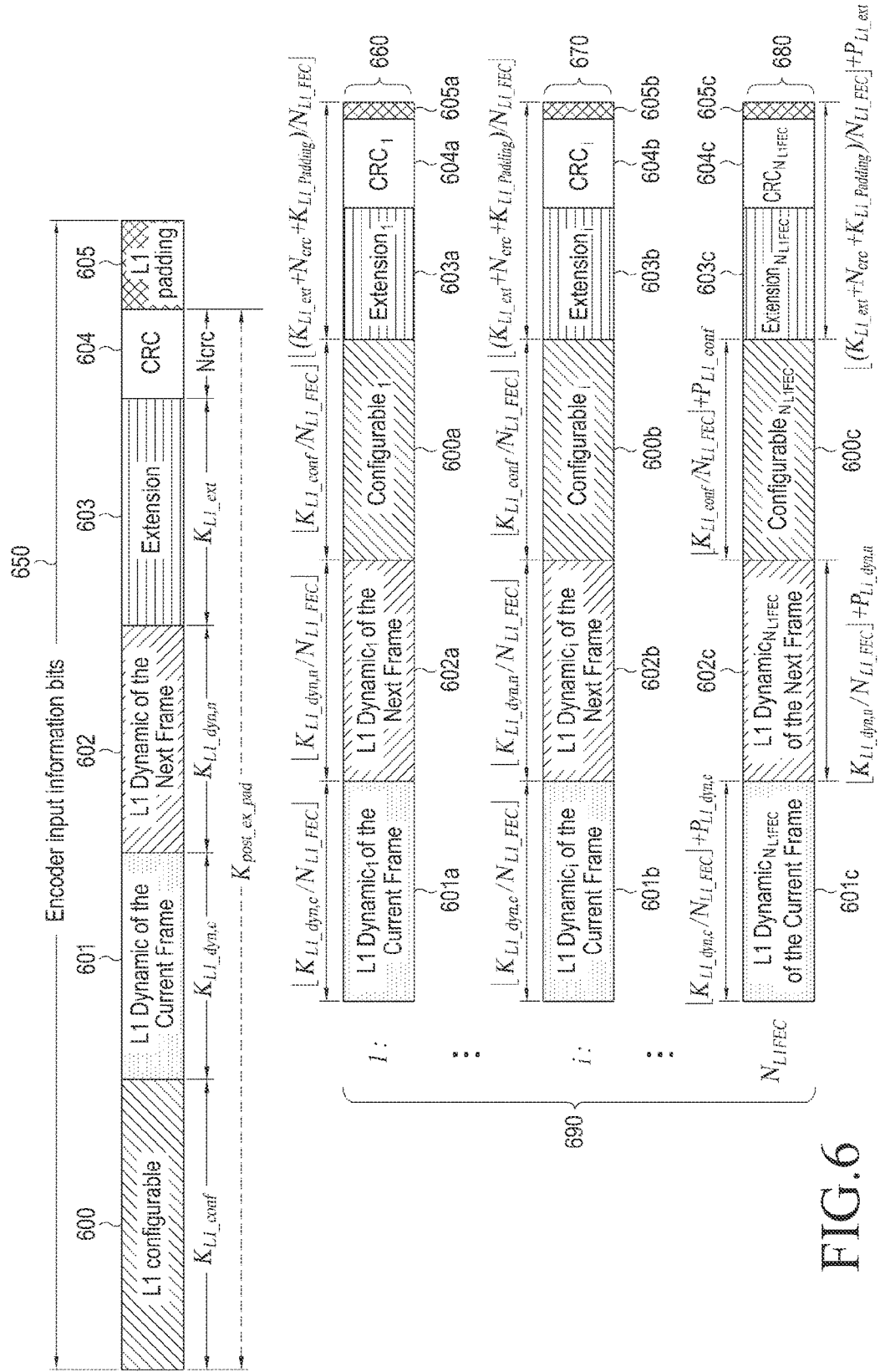
FIG. 6 illustrates information bits that are input to an encoder according to an embodiment of the present invention input.

FIG. 6 illustrates a segmentation of input information bits that are input to an encoder according to an embodiment of the present invention input. In FIG. 6, a segmentation value is $N_{post\_FEC\_Block}$.

Referring to FIG. 6, L1-post signaling information 650, i.e., information bits that are input to the encoder, includes L1 configurable information 600, L1 dynamic information of the current frame 601, L1 dynamic information of the next frame 602, extension information 603, CRC (Cyclic Redundancy Check) information 604, and L1 padding bits 605. The CRC information 604 includes parity bits of a CRC code, which a receiver uses to determine whether an error has occurred in the L1 configurable information 600, the L1 dynamic information of the current frame 601, the L1 dynamic information of the next frame 602, and the extension information 603. Although not illustrated in FIG. 6, multiple CRCs may be used. Specifically, it will be apparent to those skilled in the art that the number of the CRCs and positions thereof can be changed.

The length of the L1 configurable information 600 is $K_{L1\_conf}$, the length of the L1 dynamic information of the current frame 601 is $K_{L1\_dyn,c}$, the length of the L1 dynamic information of the next frame 602 is $K_{L1\_dyn,n}$, the length of the extension information 603 is $K_{L1\_ext}$, and the length of the CRC 604 is $N_{crc}$. When $K_{L1\_dyn,n}$, i.e., the length of the L1 dynamic information of the next frame 602, is equal to 0, the value of 0 indicates that the L1 dynamic information of the next frame 602 is not used. When the $K_{L1\_ext}$ is equal to 0, this indicates that the extension information 603 is not used. Similarly, when the $N_{crc}$ is equal to 0, this indicates that a CRC code is not used.

Each of $K_{L1\_conf}$, $K_{L1\_dyn,c}$, and $K_{L1\_dyn,n}$ may be expressed as a function of a number of PLPs. Otherwise, it is possible to know $K_{L1\_conf}$, $K_{L1\_dyn,c}$, and $K_{L1\_dyn,n}$ through predetermined signaling. For example, parameters, each representing a length, such as L1_POST_CONF_SIZE representing $K_{L1\_conf}$, L1_POST_DYN,CURRENT_SIZE representing $K_{L1\_dyn,c}$, L1_POST_DYN,NEXT_SIZE representing $K_{L1\_dyn,n}$, and L1_POST_EXT_SIZE representing the length of the extension information 603 may be transmitted through the L1-pre information 105.

When a Bose Chaudhuri Hocquenghem (BCH) code is concatenated with an LDPC code and the BCH code concatenated with the LDPC code is used for the L1 signaling information, and the length of input bits of the BCH code is $K_{bch}$, $N_{post\_FEC\_Block}$, which corresponds to the number of coded blocks of the L1 signaling information, may be calculated using Equation (1) below. Basically, the $N_{post\_FEC\_Block}$ is the number of multiple pieces of information, into which L1 signaling information bits are segmented. When considering the concatenation of the BCH code with the LDPC code, the number of coded blocks is calculated by using a length $K_{bch}$ of input bits of the BCH code. However, when only an LDPC code is used, the number of coded blocks may be calculated by using a length $K_{ldpc}$ of input bits of an LDPC code instead of $K_{bch}$.

$$N_{post\_FEC\_block} = \left\lceil \frac{K_{post\_ex\_pad}}{K_{bch}} \right\rceil \quad (1)$$

In Equation (1), $K_{post\_ex\_pad}$ is a sum of lengths of the L1 configurable information 600, the L1 dynamic information of the current frame 601, the L1 dynamic information of the next frame 602, the extension information 603, and the CRC information 604. $K_{post\_ex\_pad} = K_{L1\_conf} + K_{L1\_dyn,c} + K_{L1\_dyn,n} + K_{L1\_ext} + N_{crc}$. Namely, $K_{post\_ex\_pad}$ is the number of bits of L1-post signaling excluding a padding field. In Equation (1), $\lceil x \rceil$ represents the smallest integer greater than x. For example, $\lceil 1.2 \rceil = 2$.

Based on the $K_{post\_FEC\_Block}$ corresponding to the number of coded blocks, $K_{pad}$ corresponding to a length by which zero bits are inserted, may be calculated by using Equation (2) below.

$$K_{pad} = \left\lceil \frac{K_{post\_ex\_pad}}{N_{post\_FEC\_Block}} \right\rceil \times N_{post\_FEC\_Block} - K_{post\_ex\_pad} \quad (2)$$

In Equation (2), $\lceil x \rceil$ represents the smallest integer greater than x. For example, $\lceil 1.2 \rceil = 2$. The $K_{pad}$ corresponding to a length by which zero bits are inserted, may be omitted.

As described above with reference to FIG. 3 and FIG. 5, when each of the L1 configurable information 600, the L1 dynamic information of the current frame 601, the L1 dynamic information of the next frame 602, the extension information 603, CRC 604, and the L1 padding 605 are segmented by $N_{post\_FEC\_Block}$, the length of each of the segments may be calculated using Equations (3) to (6) below.

Specifically, a correction factor $K_{L1\_conf\_PAD}$ for the L1 configurable information 600, the length of which is $K_{L1\_conf}$, may be calculated by using Equation (3). Namely, the $K_{L1\_conf\_PAD}$ is a correction factor when the length $K_{L1\_conf}$ of the L1 configurable information is not a multiple of $N_{post\_FEC\_Block}$ corresponding to the number of coded blocks for segmentation.

$$K_{L1\_conf\_PAD} = K_{L1\_conf} - \left\lfloor \frac{K_{L1\_conf}}{N_{post\_FEC\_Block}} \right\rfloor \times N_{post\_FEC\_Block} \quad (3)$$

In Equation (3), $\lfloor x \rfloor$ represents the largest integer less than x. For example, $\lfloor 0.2 \rfloor = 1$. $K_{L1\_conf\_PAD}$ is a value that causes a length of L1 configurable information$_i$ 600b among i$^{th}$ (i=1, . . . , ($N_{post\_FEC\_Block}$−1)) encoder input information bits to be $\lfloor K_{L1\_conf}/N_{post\_FEC\_Block} \rfloor$, and that causes a length of L1 configurable information 600c among ($N_{post\_FEC\_Block}$)$^{th}$ encoder input information bits to be $\lfloor K_{L1\_conf}/N_{post\_FEC\_Block} \rfloor + K_{L1\_conf\_PAD}$.

For example, when $K_{L1\_conf}$=299 and $N_{post\_FEC\_Block}$=2, $K_{L1\_conf\_PAD}$=299−$\lfloor 299/2 \rfloor \times 2$=1.

$K_{L1\_conf\_PAD}$ having a value of 1 causes a length of L1 configurable information among first encoder input information bits to be 149, and causes a length of L1 configurable information$_2$ among second encoder input information bits to be 149+1=150. These conditions are intended to prevent additional zero padding.

A length $K_{L1\_dyn,c\_PAD}$ of a correction factor for the L1 dynamic information of the current frame 601, the length of which is $K_{L1\_dyn,c}$, as illustrated in FIG. 6, may be calculated by using Equation (4). The $K_{L1\_dyn,c\_PAD}$ a is a correction factor when the length $K_{L1\_dyn,c}$ of the L1 dynamic information of the current frame 601 is not a multiple of $N_{post\_FEC\_Block}$ corresponding to the number of coded blocks for segmentation.

$$K_{L1\_dyn,c\_PAD} = K_{L1\_dyn,c} - \left\lfloor \frac{K_{L1\_dyn,c}}{N_{post\_FEC\_Block}} \right\rfloor \times N_{post\_FEC\_Block} \quad (4)$$

In Equation (4), $\lfloor x \rfloor$ represents the largest integer less than x.

A length $K_{L1\_dyn,n\_PAD}$ of a correction factor for the L1 dynamic information of the next frame 602, the length of which is $K_{L1\_dyn,n}$, as illustrated in FIG. 6, may be calculated by using Equation (5). $K_{L1\_dyn,n\_PAD}$ is a correction factor when the length $K_{L1\_dyn,n}$ of the L1 dynamic information of the next frame is not a multiple of $N_{post\_FEC\_Block}$ corresponding to the number of coded blocks for segmentation.

$$K_{L1\_dyn,n\_PAD} = K_{L1\_dyn,n} - \left\lfloor \frac{K_{L1\_dyn,n}}{N_{post\_FEC\_Block}} \right\rfloor \times N_{post\_FEC\_Block} \quad (5)$$

In Equation (5), $\lfloor x \rfloor$ represents the largest integer less than x.

As described above, the L1 dynamic information of the next frame 602 is not always used. In this case, it is natural that the $K_{L1\_dyn,n}$ should be equal to 0. When each of the extension information 603 having the length $K_{L1\_ext}$, the CRC 604 having the length $N_{crc}$, and the L1 padding 605 having a length $K_{pad}$ is segmented according to $N_{post\_FEC\_Block}$, as in Equations (3) to (5), a length $K_{L1\_ext\_PAD}$ of a correction factor for the extension information 603+the CRC 604+the L1 padding 605 may be calculated using Equation (6) below.

$$K_{L1\_ext\_PAD} = \quad (6)$$
$$(K_{L1\_ext} + N_{crc} + K_{post}) - \left\lfloor \frac{K_{L1\_ext} + N_{crc} + K_{post}}{N_{post\_FEC\_Block}} \right\rfloor \times N_{post\_FEC\_Block}$$

In Equation (6), $K_{L1\_ext\_PAD}$ is a correction factor when the sum of the lengths of the extension information 603, the CRC 604, and the L1 padding 605 is not a multiple of $N_{post\_FEC\_Block}$ corresponding to the number of coded blocks for segmentation, and $\lfloor x \rfloor$ represents the largest integer less than x. As described above, $K_{pad}$ is not always used, and in this case, $K_{pad}$ is equal to 0. Also, $N_{crc}$ signifies a CRC bit.

A process of calculating $K_{sig}(i)$ corresponding to the number of i$^{th}$ encoder input information bits 670 using values calculated using Equations (1) to (6), is defined by Equation (7).

$$K_{sig}(i) = \left\lfloor \frac{K_{L1\_conf}}{N_{post\_FEC\_Block}} \right\rfloor + \left\lfloor \frac{K_{L1\_dyn,n}}{N_{post\_FEC\_Block}} \right\rfloor + \quad (7)$$

$$\left\lfloor \frac{K_{L1\_dyn,n}}{N_{post\_FEC\_Block}} \right\rfloor + \left\lfloor \frac{(K_{L1\_ext}+N_{crc}+K_{pad})}{N_{post\_FEC\_Block}} \right\rfloor$$

In Equation (7), $\lfloor x \rfloor$ represents the largest integer less than x. For example, $\lfloor 1.2 \rfloor = 1$.

The number of $(N_{post\_FEC\_Block})^{th}$ encoder input information bits 680 may be calculated by using Equation (8), $$K_{sig}(N_{post\_FEC\_Block}) = \left\lfloor \frac{K_{L1\_conf}}{N_{post\_FEC\_Block}} \right\rfloor + \left\lfloor \frac{K_{L1\_dyn,n}}{N_{post\_FEC\_Block}} \right\rfloor + \quad (8)$$

$$\left\lfloor \frac{K_{L1\_dyn,n}}{N_{post\_FEC\_Block}} \right\rfloor + \left\lfloor \frac{(K_{L1\_ext}+N_{crc}+K_{pad})}{N_{post\_FEC\_block}} \right\rfloor +$$

$$K_{L1\_conf\_PAD} + K_{L1\_dyn,n\_PAD} + K_{L1\_ext\_PAD}$$

In Equation (8), $\lfloor x \rfloor$ represents the largest integer less than x.

Although segmentation is performed above in such a manner that there is a difference in length between $K_{sig}(i)$ (i=1, . . . , $(N_{post\_FEC\_Block}-1)$) and $K_{sig}(N_{post\_FEC\_Block})$, that segmentation may be performed in such a manner that a difference in length between $K_{sig}(i)$ (i=1, . . . , $(N_{post\_FEC\_Block}-1)$) and $K_{sig}(N_{post\_FEC\_Block})$ does not occur. Also, as described above, changes in the equations can be made according to the number of CRCs used and the positioning thereof.

For example, when a CRC code is applied to each of the L1 configurable information 600, the dynamic information of the current frame 601, and the dynamic information of the next frame 602, the $K_{L1\_conf}$, the $K_{L1\_dyn,c}$, and the $K_{L1\_dyn,n}$ may include the number of CRC bits of the L1 configurable information 600, the number of CRC bits of the dynamic information of the current frame 601, and the number of CRC bits of the next frame 602, respectively.

In FIG. 6, reference numeral 690 denotes first encoder input information bits to $(N_{post\_FEC\_Block})^{th}$ encoder input information bits, into which all encoder input information bits denoted by reference numeral 650 are segmented using Equations (1) to (8). Although a segmentation operation is often performed by the encoder, when the encoder includes an interleaver, the interleaver may interleave (segment) all of the segmented encoder input information bits (i.e., L1 signaling information).

More specifically, reference numeral 690 denotes that first encoder input information bits 660 include information bits (segmented L1 padding bits) 600a, 601a, 602a, 603a, 604a, and 605a, which are obtained by segmenting the encoder input information bits 600, 601, 602, 603, 604, and 605 according to $N_{post\_FEC\_Block}$. Reference numeral 690 denotes that $j^{th}$ encoder input information bits 670 include information bits 600b, 601b, 602b, 603b, 604b, and 605b (which are different from the encoder input information bits 650), which are obtained by segmenting the encoder input information bits 600, 601, 602, 603, 604, and 605 according to $N_{post\_FEC\_Block}$. Reference numeral 690 denotes that $(N_{post\_FEC\_Block})^{th}$ encoder input information bits 680 include last segmentations 600c, 601c, 602c, 603c, 604c, and 605c among information bits, which are obtained by segmenting the encoder input information bits 600, 601, 602, 603, 604, and 605 according to $N_{post\_FEC\_Block}$.

Therefore, the receiver which receives the input information bits 690, decodes coded blocks obtained by encoding the encoder input information bits 660, the encoder input information bits 670, and the encoder input information bits 680. Then, the receiver reassembles, to a state before being segmented, the segmented L1 dynamic information bits of the current frame 601a, 601b, and 601c, the segmented L1 dynamic information bits of the next frame 602a, 602b, and 602c, the segmented L1 configurable information bits 600a, 600b, and 600c, the segmented extension information bits 603a, 603b, and 603c, the segmented CRC bits 604a, 604b, and 604c, and the segmented L1 padding bits 605a, 605b, and 605c. Accordingly, the receiver may restore the original L1-post signaling information.

Figure 1:
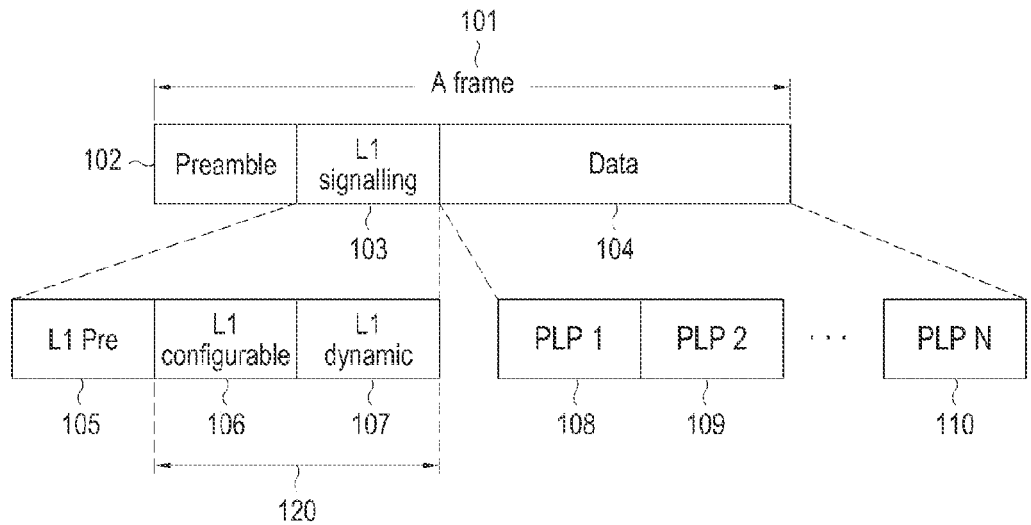
FIG. 1 illustrates a frame used in a conventional broadcasting/communication system.

When a reception apparatus according to an embodiment of the present invention knows the length $K_{L1\_conf}$ of the L1 configurable information 600, the length $K_{L1\_dyn,c}$ of the L1 dynamic information of the current frame 601, and the length $K_{L1\_dyn,n}$ of the L1 dynamic information of the next frame 602, the reception apparatus may easily restore the L1-post signaling information. In this respect, a transmission apparatus according to an embodiment of the present invention may transmit values of $K_{L1\_conf}$, $K_{L1\_dyn,c}$ and $K_{L1\_dyn,n}$. Because each value of $K_{L1\_conf}$, $K_{L1\_dyn,c}$ and $K_{L1\_dyn,n}$ may be expressed as a function of the number of PLPs, if the transmission apparatus transmits the number of PLPs, the reception apparatus may restore the L1-post signaling information. Therefore, when the transmission apparatus includes NUM_PLP (Number of PLP) information corresponding to the number of PLPs, e.g., in the L1-pre information 105 illustrated in FIG. 1, the reception apparatus can efficiently receive the L1-post signaling information.

Even when segmentation is not performed, as illustrated in FIG. 4, if the transmission apparatus transmits the number of PLPs, even when transmitting the L1 dynamic information 411 before the L1 configurable information 410, the reception apparatus can use the number of PLPs to restore the L-post signaling information. Also, if L1 dynamic information transmitted in a $K^{th}$ frame is identical to L1 dynamic information transmitted in a $(K+1)^{th}$ frame, when the reception apparatus restores the L1-post information in the $(K+1)^{th}$ frame, regardless of whether the reception apparatus succeeds in decoding the L1 dynamic information in the $K^{th}$ frame, the reception apparatus may use the L1 dynamic information of the $K^{th}$ frame.

Figure 7:
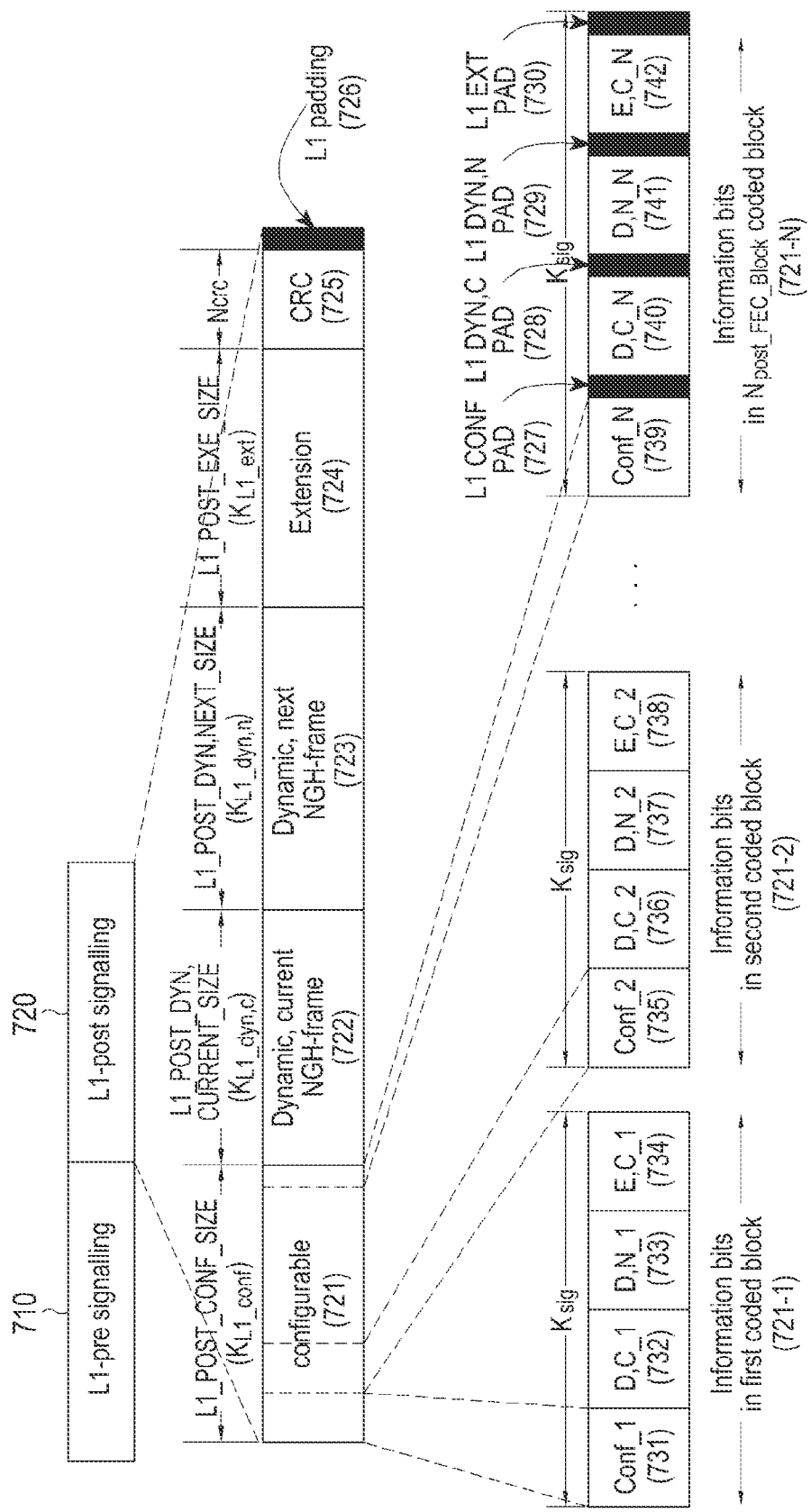
FIGS. 7 and 8 illustrate information bits that are input to an encoder according to an embodiment of the present invention.
Figure 8:
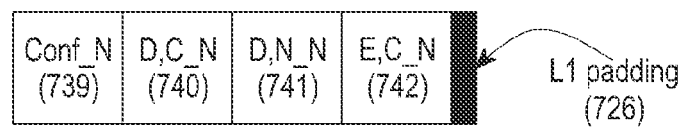

FIGS. 7 and 8 illustrate information bits that are input to an encoder according to an embodiment of the present invention. In FIG. 7, L1 dynamic information is located after L1 configurable information.

Referring to FIG. 7, a length of L1 configurable information 721 is $K_{L1\_conf}$, a length of L1 dynamic information of a current frame 722 is $K_{L1\_dyn,c}$, a length of L1 dynamic information of a next frame 723 is $K_{L1\_dyn,n}$, a length of an extension field 724 is $K_{L1\_ext}$, and a length of CRC 725 is $N_{crc}$.

The length $K_{L1\_conf}$ of the L1 configurable information 721 may be acquired using a parameter L1_POST_CONF_SIZE, or a number of PLPs. The parameters (L1_POST_CONF_SIZE or the number of PLPs) can be transmitted in L1-pre signaling alone or together. The length $K_{L1\_dyn,c}$ of the L1 dynamic information of the current frame 722 may be acquired using a parameter L1_POST_DYN,CURRENT_SIZE, or the number of PLPs. The parameters can be transmitted in L1-pre signaling alone or together. The length $K_{L1\_dyn,n}$ of the L1 dynamic information of the next frame 723 may be acquired using a parameter L1_POST_DYN,NEXT_SIZE, or the number of PLPs. The parameters can be transmitted in L1-pre signaling alone or together. The length $K_{L1\_ext}$ of the extension field 724 may be acquired using a parameter L1_POST_EXT_SIZE. The length $N_{crc}$ of the CRC 725 may be fixed, e.g., 32.

Referring to FIG. 7, L1-post signaling 720 includes a variable number of bits, which are transmitted through one or more LDPC blocks according to the length of the L1-post signaling. The LDPC block has the same meaning as a coded block.

$N_{post\_FEC\_Block}$ corresponding to the number of LDPC blocks for the L1-post signaling 720 is determined using Equation (9).

$$N_{post\_FEC\_Block} = \begin{cases} \text{If} & K_{post\_ex\_pad} \le K_{bch}, 1 \\ \text{Otherwise,} & \left\lceil \dfrac{K_{post\_ex\_pad}}{K_{bch} - A} \right\rceil \end{cases} \quad (9)$$

In Equation (9), when $K_{bch}$ is greater than or equal to $N_{post\_ex\_pad}$, $N_{post\_FEC\_Block}$ is equal to 1. However, when $K_{bch}$ is less than $K_{post\_ex\_pad}$, $N_{post\_FEC\_Block}$ is $$\left\lceil \dfrac{K_{post\_ex\_pad}}{K_{bch} - A} \right\rceil.$$

The value of A is a correction factor that causes $K_{sig}$, which represents the number of information bits in a coded block after the segmentation, to be less than or equal to the $K_{bch}$, and may be changed according to the number of types of signals that are segmented. For example, when each of the L1 configurable information 721, the L1 dynamic information of the current frame 722, the L1 dynamic information of the next frame 723, and the extension information 724 is segmented, each of the 4 pieces of information is segmented. Accordingly, the value of A may be 3.

When the L1 dynamic information of the next frame 723 is not used in any frame, the value of A may be 2, but the value of A may be fixed to 3, for an efficiency of a system.

In Equation (9), ⌈x⌉ signifies the smallest integer equal to or greater than x, and the value of $K_{bch}$ represents the number of BCH information bits.

In the above-described case, when concatenating the BCH code with the LDPC code, the number of coded blocks is calculated using a length $K_{bch}$ of input bits of the BCH code. However, when only an LDPC code is used, the number of coded blocks may be calculated using a length $K_{ldpc}$ of input bits of an LDPC code instead of $K_{bch}$.

$K_{post\_ex\_pad}$ is a value which may be obtained by adding the length $N_{crc}$ of the CRC 725 to a sum of parameters L1_POST_CONF_SIZE, L1_POST_DYN,CURRENT_SIZE, L1_POST_DYN,NEXT_SIZE, and L1_POST_EXT_SIZE, which represent the length of the L1 configurable information 721, the length of the L1 dynamic information of the current frame 722, the length of the L1 dynamic information of the next frame 723, and the length of the extension field 724, respectively. Also, $K_{post\_ex\_pad}$ represents the number of bits of L1-post signaling excluding L1_PADDING 726 corresponding to a padding field. The length $N_{crc}$ of the CRC may be determined based on a maximum length of the L1-post signaling, e.g., 32. In this case, $K_{L1\_PADDING}$ corresponding to the length of a field named L1_PADDING 726 may be calculated using Equation (10) below.

$$K_{L1\_PADDING} = K_{L1\_conf\_PAD} + K_{L1\_dyn,c\_PAD} + K_{L1\_dyn,n\_PAD} + K_{L1\_ext\_PAD} \quad (10)$$

In Equation (10), $K_{L1\_conf\_PAD}$ represents a length of a padding field of L1 configurable information, $K_{L1\_dyn,c\_PAD}$ represents a length of a padding field of L1 dynamic information of the current frame, $K_{L1\_dyn,n\_PAD}$ represents a length of a padding field of L1 dynamic information of the next frame, and $K_{L1\_ext\_PAD}$ represents a length of a padding field of the extension field 724 including the CRC 725. The length of each of L1_CONF_PAD 727, L1_DYN,C_PAD 728, L1_DYN,N_PAD 729, and L1_EXT_PAD 730, which are padding fields, may be calculated using Equations (11) to (14) below.

$$K_{L1\_conf\_PAD} = \left\lceil \dfrac{K_{L1\_conf}}{N_{post\_FEC\_Block}} \right\rceil \times N_{post\_FEC\_Block} - K_{L1\_conf} \quad (11)$$

$$K_{L1\_dyn,c\_PAD} = \left\lceil \dfrac{K_{L1\_dyn,c}}{N_{post\_FEC\_Block}} \right\rceil \times N_{post\_FEC\_Block} - K_{L1\_dyn,c} \quad (12)$$

$$K_{L1\_dyn,n\_PAD} = \left\lceil \dfrac{K_{L1\_dyn,n}}{N_{post\_FEC\_Block}} \right\rceil \times N_{post\_FEC\_Block} - K_{L1\_dyn,n} \quad (13)$$

$$K_{L1\_ext\_PAD} = \left\lceil \dfrac{K_{L1\_ext} + N_{crc}}{N_{post\_FEC\_Block}} \right\rceil \times N_{post\_FEC\_Block} - (K_{L1\_ext} + N_{crc}) \quad (14)$$

In Equations (11) to (14), $K_{L1\_conf}$, $K_{L1\_dyn,c}$, $K_{L1\_dyn,n}$, and $K_{L1\_ext}$ are values acquired using parameters L1_POST_CONF_SIZE, L1_POST_DYN,CURRENT_SIZE, L1_POST_DYN,NEXT_SIZE, and L1_POST_EXT_SIZE, respectively. These parameters represent the length of L1 configurable information, the length of L1 dynamic information of the current frame, the length of L1 dynamic information of the next frame, and the length of an extension field, respectively. $N_{crc}$ corresponds to the number of CRC bits, e.g., 32. When L1_REPETITION_FLAG, which indicates whether the L1 dynamic information of the next frame is used, is set to 0, the length $K_{L1\_dyn,n}$ of the L1 dynamic information of the next frame is 0.

$K_{post}$ corresponding to the final length of the entire L1-post signaling including a padding field may be defined using Equation (15) below.

$$K_{post} = K_{post\_ex\_pad} + K_{L1\_PADDING} \quad (5)$$

In this case, $K_{sig}$, which corresponds to the number of information bits in each $N_{post\_FEC\_Block}$ block, may be defined using Equation (16) below.

$$K_{sig} = \dfrac{K_{post}}{N_{post\_FEC\_Block}} \quad (16)$$

As illustrated in FIG. 7, to obtain better performance, the L1 configurable information (configurable L1 post signaling) 721, the L1 dynamic information of the current frame (dynamic L1 post signaling for the current frame) 722, and the L1 dynamic information of the next frame (dynamic L1 post signaling for the next frame) 723 are distributed as uniformly as possible in all Forward Error Correction (FEC) blocks.

Specifically, input bits of a first coded block illustrated in FIG. 7 include first L1 configurable information (Configurable₁ or Conf_1) 731, first L1 dynamic information of the current frame (Dynamic,currentFrame₁ or D,C_1) 732, first L1 dynamic information of the next frame (Dynamic,next-Frame₁ or D,N_1) 733, and a first extension field (Extension₁ or E,C_1) 734. The first L1 configurable information 731 includes $\lceil K_{L1\_conf}/N_{post\_FEC\_Block}\rceil$ bits among bits of the L1 configurable information 710. The first L1 dynamic information of the current frame 732 includes $\lceil K_{L1\_dyn,c}/N_{post\_FEC\_Block}\rceil$ bits among bits of the L1 dynamic information of the current frame 722. The first L1 dynamic information of the next frame 733 includes $\lceil K_{L1\_dyn,n}/N_{post\_FEC\_Block}\rceil$ bits among bits of the L1 dynamic information of the next frame 723. The first extension field 734 includes $\lceil (K_{L1\_ext}+N_{crc})/N_{post\_FEC\_Block}\rceil$ bits among bits of the extension field 724 and bits of the CRC 725.

In accordance with an embodiment of the present invention, bits of the extension field 724 of the L1-post signaling and bits of the CRC 725 thereof are all included in the first extension field 734 among the input bits of the first coded block. The above construction is performed by an identical method from the first coded block to the $(N_{post\_FEC\_Block}-1)^{th}$ coded block.

Information bits in the $(N_{post\_FEC\_Block})^{th}$ coded block include $N^{th}$ configurable information (Configurable$_N$ or Conf_N) 739, $N^{th}$ L1 dynamic information of the current frame (Dynamic,currentFrame$_N$ or D,C_N) 740, $N^{th}$ L1 dynamic information of the next frame (Dynamic,nextFrame$_N$ or D,N_N) 741, an $N^{th}$ extension field (Extension$_N$ or E,C_N) 742, and padding fields, such as L1_CONF_PAD 727, L1_DYN,C_PAD 728, L1_DYN,N_PAD 729, and L1_EXT_PAD_730. The $N^{th}$ configurable information 739 includes $(\lceil K_{L1\_conf}/N_{post\_FEC\_Block}\rceil-K_{L1\_conf\_PAD})$ bits among bits of the configurable information 710. The $N^{th}$ L1 dynamic information of the current frame 740 includes $(\lceil K_{L1\_dyn,c}/N_{post\_FEC\_Block}\rceil-K_{L1\_dyn,c\_PAD})$ bits among bits of the L1 dynamic information of the current frame 722. The $N^{th}$ L1 dynamic information of the next frame 741 includes $(\lceil K_{L1\_dyn,n}/N_{post\_FEC\_Block}\rceil-K_{L1\_dyn,n\_PAD})$ bits among bits of the L1 dynamic information of the next frame 723. An $N^{th}$ extension field 742 includes $(\lceil (K_{L1\_ext}+N_{crc})/N_{post\_FEC\_Block}\rceil-K_{L1\_ext\_PAD})$ bits among bits of the extension field 724 and bits of the CRC 725.

In accordance with an embodiment of the present invention, bits of the extension field 724 of the L1-post signaling and bits of the CRC 725 thereof are all included in the first extension field 734 among the input bits of the first coded block, $K_{L1\_ext\_PAD}$ is the length of a padding field of the bits of the extension field 724 of the L1-post signaling and the bits of the CRC 725 thereof. 0 may be inserted into the padding field. Additionally, the position of the padding field may be changed.

For example, all of the padding fields may be located at the end of encoding input, as illustrated in FIG. 8.

According to an embodiment of the present invention, when the parameter L1_POST_EXT_SIZE is first set to a value including the length of the extension field and the length of the CRC, instead of being set to only the length of the extension field, and then transmitted, $K_{L1\_ext}$ may be thought of as a value obtained by adding the length of the extension field and $N_{crc}$. In this case, all of the $N_{crc}$s may be deleted.

Figure 9:
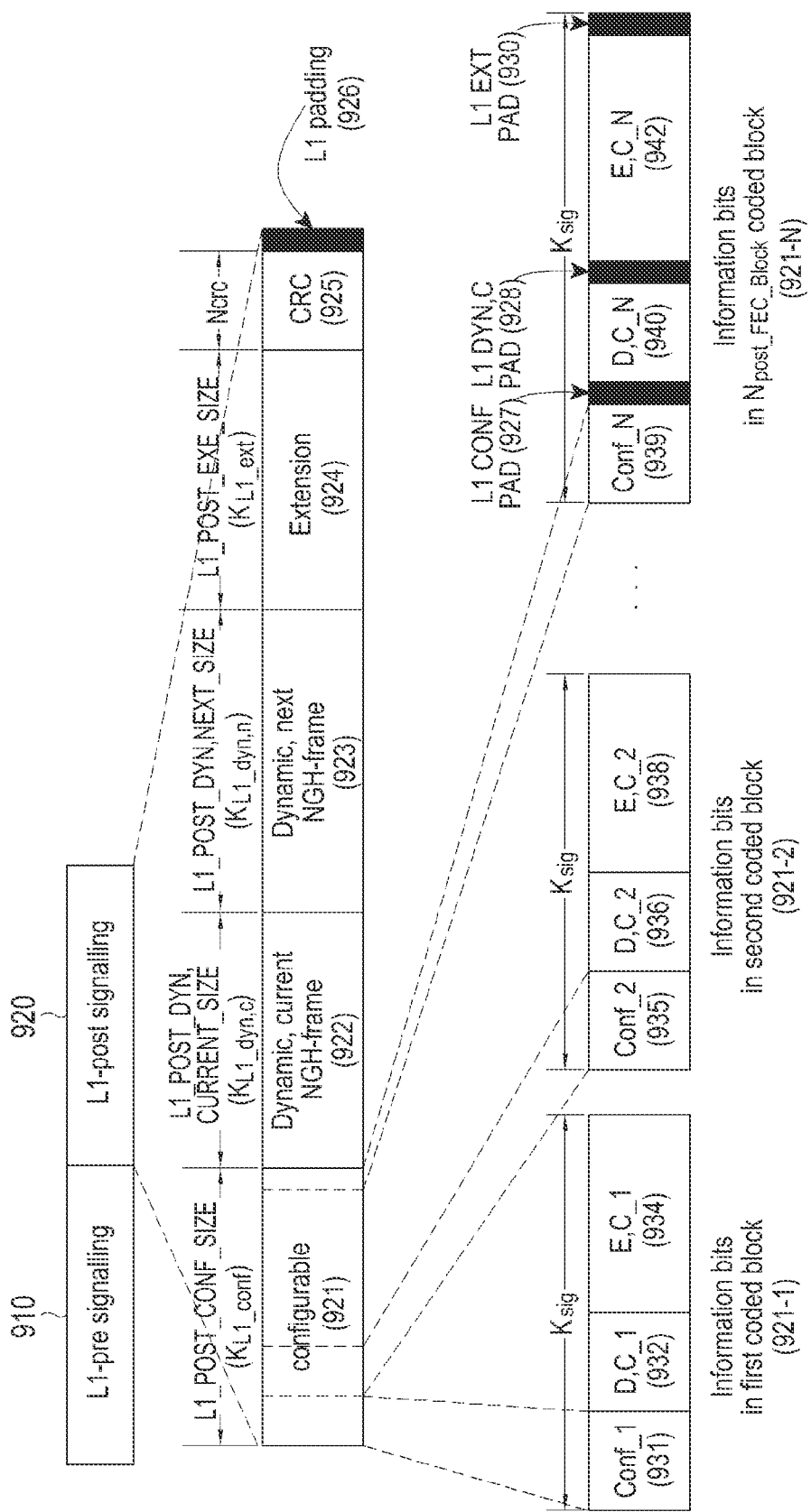
FIG. 9 illustrates information bits that are input to an encoder according to an embodiment of the present invention.

FIG. 9 illustrates information bits that are input to an encoder according to an embodiment of the present invention.

Referring to FIG. 9, a length of L1 configurable information 921 is $K_{L1\_conf}$, a length of L1 dynamic information of the current frame 922 is $K_{L1\_dyn,c}$, a length of L1 dynamic information of the next frame 923 is $K_{L1\_dyn,n}$, a length of an extension field 924 is $K_{L1\_ext}$, and a length of CRC 925 is $N_{crc}$.

The length $K_{L1\_conf}$ of the L1 configurable information 921 may be acquired using a parameter L1_POST_CONF_SIZE, or using the number of PLPs. The length $K_{L1\_dyn,c}$ of the L1 dynamic information of the current frame 922 may be acquired using a parameter L1_POST_DYN,CURRENT_SIZE, or using the number of PLPs. The length $K_{L1\_dyn,n}$ of the L1 dynamic information of the next frame 923 may be acquired using a parameter L1_POST_DYN,NEXT_SIZE, or using the number of PLPs. The length $K_{L1\_ext}$ of the extension field 924 may be acquired using a parameter L1_POST_EXT_SIZE. The length $N_{crc}$ of the CRC 925 may be, e.g., 32. In this case, although a sum of the length of the L1 dynamic information of the next frame 923 and the length of the extension field 924 or the length of the CRC may be expressed as one parameter, it is assumed that the parameters separately exist for the convenience of description of the present invention.

Referring to FIG. 9, L1-post signaling 920 includes a variable number of bits, which are transmitted through one or more LDPC blocks according to the length of the L1-post signaling. The LDPC block has the same meaning as a coded block illustrated in FIG. 9.

$N_{post\_FEC\_Block}$ corresponding to the number of LDPC blocks for the L1-post signaling 920 is determined using Equation (17) below.

$$N_{post\_FEC\_Block} = \begin{cases} \text{If} & K_{post\_ex\_pad} \le K_{bch}, 1 \\ \text{Otherwise,} & \left\lceil \dfrac{K_{post\_ex\_pad}}{K_{bch} - A} \right\rceil \end{cases} \quad (17)$$

In Equation (17), when $K_{bch}$ is greater than or equal to $K_{post\_ex\_pad}$, $N_{post\_FEC\_Block}$ is equal to 1. However, when $K_{bch}$ is less than $K_{post\_ex\_pad}$, $N_{post\_FEC\_Block}$ is $$\left\lceil \frac{K_{post\_ex\_pad}}{K_{bch} - A} \right\rceil.$$

The value of A is a correction factor that causes $K_{sig}$, which is the number of information bits in a coded block after the segmentation, to be less than or equal to the $K_{bch}$, and may be changed according to the number of types of signaling that are segmented.

For example, when each of the L1 configurable information 921, the L1 dynamic information of the current frame 922, the L1 dynamic information of the next frame 923, and the extension information 924 is segmented, each of the 3 pieces of information is segmented. Accordingly, the value of A may be 2.

In Equation (17), $\lceil x \rceil$ signifies the smallest integer equal to or greater than x, and the value of $K_{bch}$ represents the number of BCH information bits. When concatenating the BCH code with the LDPC code, the number of coded blocks is calculated using a length $K_{bch}$ of input bits of the BCH code. However, when only an LDPC code is used, the number of coded blocks may be calculated using a length $K_{ldpc}$ of input bits of an LDPC code, instead of $K_{bch}$.

$K_{post\_ex\_pad}$ is a value obtained by adding the length $N_{crc}$ of the CRC 925 to a sum of parameters L1_POST_CONF_SIZE, L1_POST_DYN,CURRENT_SIZE, L1_POST_DYN,NEXT_SIZE, and L1_POST_EXT_SIZE, which represent the length of the L1 configurable information 921, the length of the L1 dynamic information of the current frame 922, the length of the L1 dynamic information of the next frame 923, and the length of the extension field 924, respectively. Also, $K_{post\_ex\_pad}$ represents the number of bits of L1-post signaling, excluding L1_PADDING 926 corresponding to a padding field. The length $N_{crc}$ of the CRC may be determined based on a maximum length of the L1-post signaling.

$K_{L1\_PADDING}$ corresponding to the length of a field named L1_PADDING 926 may be calculated using Equation (18) below.

$$K_{L1\_PADDING} = K_{L1\_conf\_PAD} + K_{L1\_dyn,c\_PAD} + K_{L1\_ext\_PAD} \quad (18)$$

In Equation (18), $K_{L1\_conf\_PAD}$ of MAD represents the length of a padding field of L1 configurable information, $K_{L1\_dyn,c\_PAD}$ represents the length of a padding field of L1 dynamic information of the current frame, and $K_{L1\_ext\_PAD}$ represents the length of a padding field of the extension field 924 including the L1 dynamic information of the next frame 923 and the CRC 925. Lengths of L1_CONF_PAD 927, L1_DYN,C_PAD 928 and L_EXT_PAD 930, which are padding fields, may be calculated using Equations (19), (20) and (21), respectively.

$$K_{L1\_conf\_PAD} = \left\lceil \frac{K_{L1\_conf}}{N_{post\_FEC\_Block}} \right\rceil \times N_{post\_FEC\_Block} - K_{L1\_conf} \quad (19)$$

$$K_{L1\_dyn,c\_PAD} = \left\lceil \frac{K_{L1\_dyn,c}}{N_{post\_FEC\_Block}} \right\rceil \times N_{post\_FEC\_Block} - K_{L1\_dyn,c} \quad (20)$$

$$K_{L1\_ext\_PAD} = \left\lceil \frac{K_{L1\_dyn,n} + K_{L1\_ext} + N_{crc}}{N_{post\_FEC\_Block}} \right\rceil \times N_{post\_FEC\_Block} - (K_{L1\_dyn,n} + K_{L1\_ext} + N_{crc}) \quad (21)$$

In Equations (19) to (21), $K_{L1\_conf}$, $K_{L1\_dyn,c}$, $K_{L1\_dyn,n}$, and $K_{L1\_ext}$ are values that may be acquired using parameters L1_POST_CONF_SIZE, L1_POST_DYN,CURRENT_SIZE, L1_POST_DYN,NEXT_SIZE, and L1_POST_EXT_SIZE, respectively. These parameters represent the length of the L1 configurable information 921, the length of the L1 dynamic information of the current frame 922, the length of the L1 dynamic information of the next frame 923, and the length of the extension field 924, respectively. $N_{crc}$, which corresponds to the number of CRC bits, may be, e.g., 32.

When L1_REPETITION_FLAG, which indicates whether the L1 dynamic information of the next frame is used, is set to 0, the length $K_{L1\_dyn,n}$ of the L1 dynamic information of the next frame is equal to 0. In this case, a sum of the length of the dynamic information of the next frame and the length of the extension field may be expressed as one parameter. For example, $(K_{L1\_dyn,n} + K_{L1\_ext})$ may be expressed as $K_{L1\_dyn,n,ext}$, and $K_{L1\_dyn,n,ext}$ (L1_POST_DYN,N,EXT_SIZE) may be acquired using the parameters, each representing respective length.

$K_{post}$, which corresponds to the final length of the entire L1-post signaling including a padding field, may be defined using Equation (22) below.

$$K_{post} = K_{post\_ex\_pad} + K_{L1\_PADDING} \quad (22)$$

$K_{sig}$, which corresponds to the number of information bits in each $N_{post\_FEC\_Block}$ block, may be defined using Equation (23).

$$K_{sig} = \frac{K_{post}}{N_{post\_FEC\_Block}} \quad (23)$$

As illustrated in FIG. 9, in order to obtain better performance, the L1 configurable information (configurable L1 post signaling) 921, the L1 dynamic information of the current frame (dynamic L1 post signaling for the current frame) 922, the L1 dynamic information of the next frame (dynamic L1 post signaling for the next frame) 923, and the extension field 924 are distributed as uniformly as possible in all FEC blocks.

Specifically, input bits of a first coded block include first L1 configurable information (Configurable$_1$ or Conf_1) 931, first L1 dynamic information of the current frame (Dynamic, currentFrame$_1$ or D,C_1) 932, and a first extension field (Extension$_1$ or E,C_1) 934. The first L1 configurable information 931 includes $\lceil K_{L1\_conf}/N_{post\_FEC\_Block} \rceil$ bits among bits of the L1 configurable information 910. The first L1 dynamic information of the current frame 932 includes $\lceil K_{L1\_dyn,c}/N_{post\_FEC\_Block} \rceil$ bits among bits of the L1 dynamic information of the current frame 922. The first extension field 934 includes $\lceil (K_{L1\_dyn,n} + K_{L1\_ext} + N_{crc})/N_{post\_FEC\_Block} \rceil$ bits among bits of the L1 dynamic information of the next frame 923, bits of the extension field 924, and bits of the CRC 925. The above construction is performed by an identical method from the first coded block to the $(N_{post\_FEC\_Block}-1)^{th}$ coded block.

Information bits in the $(N_{post\_FEC\_Block}-1)^{th}$ coded block include N$^{th}$ configurable information (Configurable$_N$ or Conf_N) 939, N$^{th}$ L1 dynamic information of the current frame (Dynamic,currentFrame$_N$ or D,C_N) 940, an N$^{th}$ extension field (Extension$_N$ or E,C_N) 942, and padding fields, such as L1_CONF_PAD 927, L1_DYN,C_PAD 928, and L1_EXT_PAD 930. $N_{post\_FEC\_Block}$ The N$^{th}$ configurable information 939 includes ($\lceil K_{L1\_conf}/N_{post\_FEC\_Block} \rceil - K_{L1\_conf\_PAD}$) bits among bits of the configurable information 910. The N$^{th}$ L1 dynamic information of the current frame 940 includes ($\lceil K_{L1\_dyn,c}/N_{post\_FEC\_Block} \rceil - K_{L1\_dyn,c\_PAD}$) bits among bits of the L1 dynamic information of the current frame 922. An N$^{th}$ extension field 942 includes ($\lceil (K_{L1\_dyn,n} + K_{L1\_ext} + N_{crc})/N_{post\_FEC\_Block} \rceil - K_{L1\_ext\_PAD}$) bits among bits of the L1 dynamic information of the next frame 923, bits of the extension field 924, and bits of the CRC 925. A 0 may be inserted into the padding field. Additionally, the position of the padding field may be changed. For example, the padding fields may be located at the end of encoding input.

In accordance with another embodiment of the present invention, segmentation is performed when the L1 dynamic information of the current frame 722, the L1 dynamic information of the next frame 723, the extension field 724 and the CRC 725 are considered as one field. In this case, information acquired in the previous frame may not be used in the current frame for the L1 dynamic information of the next frame 723, and the extension field 724 and the CRC 725, and L1-post signaling may include or may not include the L1 dynamic information of the next frame 732 and the extension field 724. Accordingly, the L1 dynamic information of the next frame 723, the extension field 724 and the CRC 725 may be considered as one field in order to simplify segmentation, and then the segmentation may be performed.

In this case, a correction factor A may be equal to 1 in Equation (17). Based on the value of $N_{post\_FEC\_Block}$ calculated using Equation (17), the length $K_{L1\_PADDING}$ of the field L1_PADDING 726 may be calculated using Equation (24).

$$K_{L1\_PADDING} = K_{L1\_conf\_PAD} + K_{L1\_ext\_PAD} \quad (24)$$

In Equation (24), $K_{L1\_conf\_PAD}$ represents the length of a padding field of L1 configurable information, and $K_{L1\_ext\_PAD}$ represents the length of a padding field of the extension field 724 including the L1 dynamic information of the current frame 722, the L1 dynamic information of the next frame 723, and the CRC 725. Lengths of L1_CONF_PAD and L1_EXT_PAD, which are padding fields, may be calculated using Equations (25) and (26), respectively.

$$K_{L1\_conf\_PAD} = \left\lceil \frac{K_{L1\_conf}}{N_{post\_FEC\_Block}} \right\rceil \times N_{post\_FEC\_Block} - K_{L1\_conf} \quad (25)$$

$$K_{L1\_ext\_PAD} = \quad (26)$$
$$\left\lceil \frac{K_{L1\_dyn,c} + K_{L1\_dyn,n} + K_{L1\_ext} + N_{crc}}{N_{post\_FEC\_Block}} \right\rceil \times N_{post\_FEC\_Block} -$$
$$(K_{L1\_dyn,c} + K_{L1\_dyn,n} + K_{L1\_ext} + N_{crc})$$

In Equations (25) and (26), $K_{L1\_conf}$, $K_{L1\_dyn,c}$, $K_{L1\_dyn,n}$, and $K_{L1\_ext}$ a are values calculated using parameters L1_POST_CONF_SIZE, L1_POST_DYN,CURRENT_SIZE, L1_POST_DYN,NEXT_SIZE, and L1_POST_EXT_SIZE, respectively. These parameters represent the length of the L1 configurable information 721, the length of the L1 dynamic information of the current frame 722, the length of the L1 dynamic information of the next frame 723, and the length of the extension field 724, respectively. $N_{crc}$, which corresponds to the number of CRC bits, may be, e.g., 32.

When L1_REPETITION_FLAG, which indicates whether the L1 dynamic information of the next frame is used, is set to 0, the length $K_{L1\_dyn,n}$ of the L1 dynamic information of the next frame is equal to 0. In this case, the sum of the length of the dynamic information of the current frame, the length of the dynamic information of the next frame, and the length of the extension field may be expressed as one parameter.

In accordance with another embodiment of the present invention, the L1-post signaling does not include the extension field 724. In this case, the value of $K_{L1\_ext}$ becomes 0, and only segmented bits of the CRC field 725 are included in extension fields 734, 738, and 742 among the segmented information bits that are input to coded blocks. In this case, the number of segmented bits of the CRC field may be very small, such that it may be inefficient to first segment the extension field 724 and the CRC field 725 and then construct the extension fields 734, 738, and 742 from the segmented extension field 724 and the segmented CRC field 725. Therefore, in this case, it may be more efficient to segment the CRC field 725 with the L1 dynamic information of the next frame 723.

Specifically, instead of simultaneously segmenting the extension field 724 and the CRC field 725 (because the value of the extension field is equal to 0), the L1 dynamic information of the next frame 723 and the CRC field 725 are simultaneously segmented, and then the first L1 dynamic information of the next frame 733, the second L1 dynamic information of the next frame 737, and the $(N_{post\_FEC\_Block})^{th}$ L1 dynamic information of the next frame 741 are constructed from the segmented L1 dynamic information of the next frame 723 and the segmented CRC field 725.

In accordance with another embodiment of the present invention, an extension field and the L1 dynamic information of the next frame 723 do not exist. In this case, as described in the above example, the number of segmented bits of the CRC field may be very small, such that segmentation may be inefficient. Therefore, in this case, the CRC field 725 is segmented with the L1 dynamic information of the current frame 722, and then the first L1 dynamic information of the current frame 731, the second dynamic information of the current frame 735, and the $(N_{post\_FEC\_Block})^{th}$ dynamic information of the current frame 739 are constructed from the segmented CRC field 725 and the segmented L1 dynamic information of the current frame 722.

Figure 10:
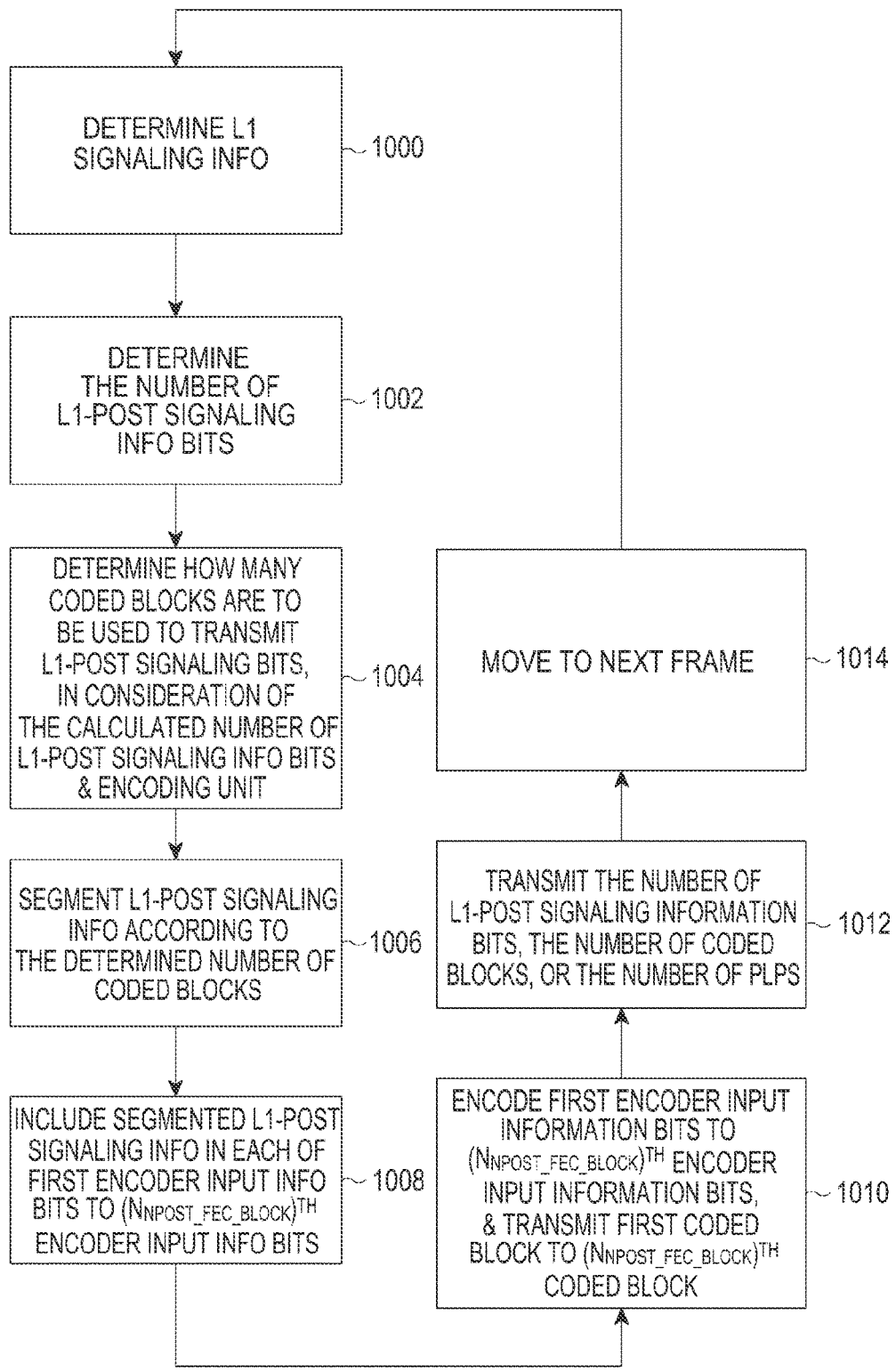
FIG. 10 is a flowchart illustrating a method for encoding and transmitting control information by a transmission apparatus according to an embodiment of the present invention.

FIG. 10 is a flowchart illustrating a method for encoding and transmitting control information by a transmission apparatus according to an embodiment of the present invention.

Referring to FIG. 10, in step 1000, a transmission apparatus determines L1 signaling information, and generates L1-pre information and L1-post signaling information. However, because the present invention relates to encoding L1-post signaling information, the following description will not describe encoding of the L1-pre information.

In step 1002, the transmission apparatus determines the number of bits of the L1-post signaling information, excluding a padding field. In step 1004, the transmission apparatus determines a number of coded blocks to be used to transmit L1-post signaling bits, based on the number of bits of the L1-post signaling information, excluding the padding field, and an encoding unit. Herein, the encoding unit is a size based on which an encoder performs encoding at one time, and is also referred to herein as "the number of encoder input information bits". When BCH encoding is concatenated with LDPC encoding, the encoding unit is the number of information bits that are permitted to be input to a BCH encoder, and thus, is also referred to as BCH information bits. Also, the number of bits of the L1-post signaling information excluding the padding field is equal to a sum of the number of bits of L1 configurable information, the number of bits of L1 dynamic information of a current frame, the number of bits of L1 dynamic information of a next frame, and the number of bits of CRC and an extension field.

In step 1006, the transmission apparatus segments the L1-post signaling information according to the determined number of coded blocks. The segmentation scheme may use the equations described above.

More specifically, in step 1006, first, a calculation is made of the number of padding bits corresponding to a correction factor for each of multiple pieces of information (bits of L1 configurable information, bits of L1 dynamic information of the current frame, bits of L1 dynamic information of the next frame, and bits of CRC and an extension field). The number all padding bits of the L1-post signaling is obtained by adding the first to fourth calculated numbers of padding bits of the multiple pieces of information.

Thereafter, the number of bits of the L1-post signaling is calculated using the number of padding bits of the L1-post signaling and the number of bits of the L1-post signaling information, excluding the padding field. The number of input bits for each coded block may be obtained by dividing the calculated number of bits of the L1-post signaling by the number of coded blocks. In other words, encoding is perform by inputting as many L1-post signaling bits as the obtained number of input bits to the encoder.

Next, each of the above multiple pieces of information (bits of the L1 configurable information, bits of the L1 dynamic information of the current frame, bits of the L1 dynamic information of the next frame, and bits of the CRC and the extension field) are segmented according to the determined number of coded blocks, and input bits for code blocks, each having a length corresponding to the obtained number of input bits, are constructed. In each of the above multiple pieces of information, the number of groups of the constructed input bits for code blocks is equal to the determined number of coded blocks.

In step 1008, the transmission apparatus includes the L-post signaling information segmented in step 1006 in each of first encoder input information bits to ($N_{post\_FEC\_Block}$)$^{th}$ encoder input information bits. In step 1010, the transmitter encodes the first encoder input information bits to the ($N_{post\_FEC\_Block}$)$^{th}$ encoder input information bits, and then transmits a first coded block to an ($N_{post\_FEC\_Block}$)$^{th}$ coded block to a receiver.

In step 1012, after the transmission apparatus transmits the number of bits of the L1-post signaling information, the number of coded blocks, or the number of PLPs to the reception apparatus, it moves to the next frame in step 1014, and repeats steps 1000 to step 1012 for the next frame.

In FIG. 10, although step 1012 has been described as being performed after step 1010 is performed, step 1012 may be performed before step 1010. Also, although the transmission apparatus has been described as transmitting the number of bits of the L1-post signaling information, the number of coded blocks, or the number of PLPs to the reception apparatus in step 1012, the transmission apparatus may transmit all of the information, or it may transmit only some (e.g., the number of PLPs) of the information.

For example, in a broadcasting/communication system according to an embodiment of the present invention, when the transmission apparatus transmits the number of bits of the L1-post signaling information and information on a signaling code (an LDPC codeword length and a code rate) without transmitting the number of coded blocks, the reception apparatus may estimate the number of coded blocks by using this information.

Figure 11:
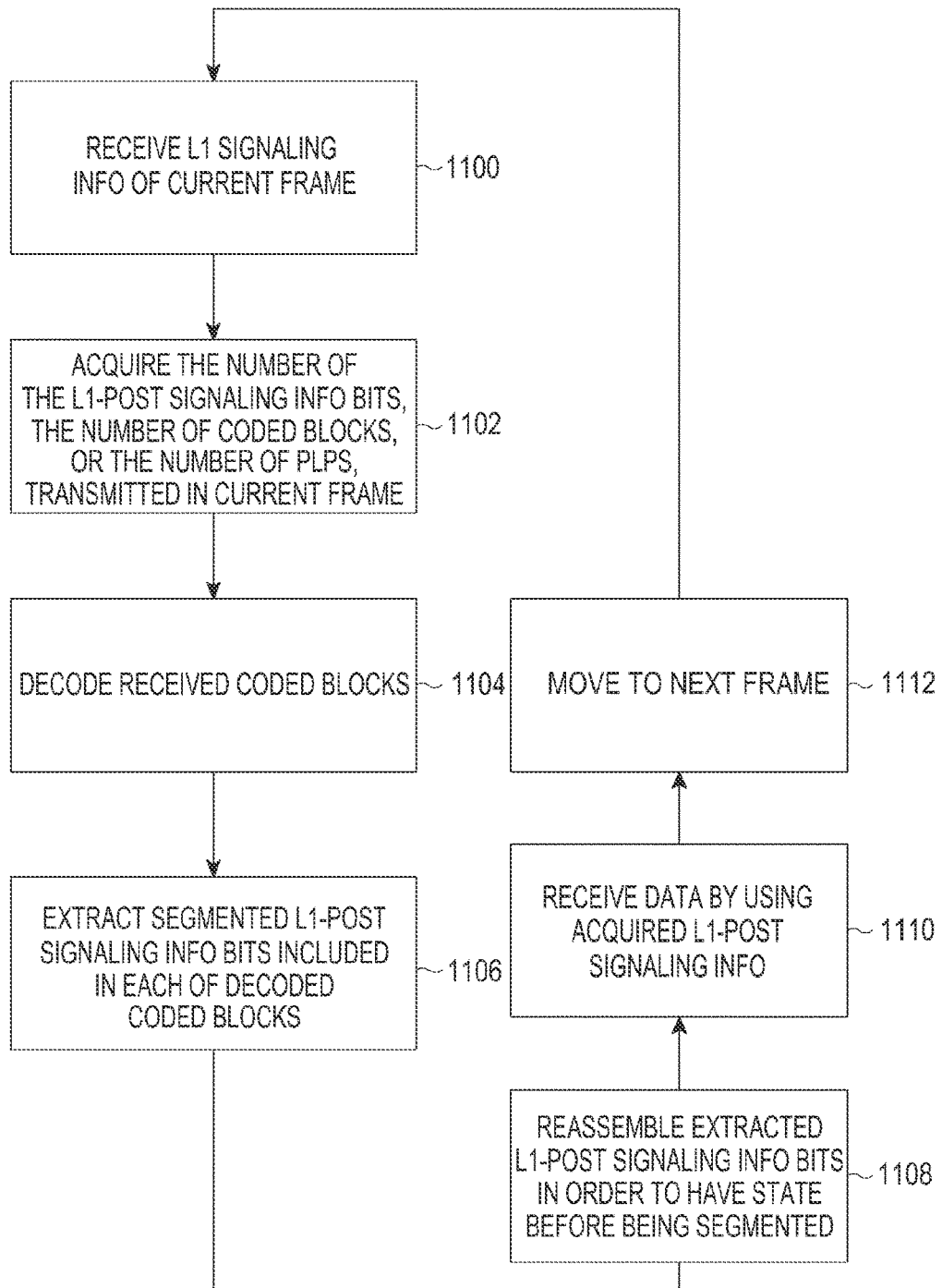
FIG. 11 is a flowchart illustrating a method for receiving control information by a reception apparatus according to an embodiment of the present invention.

FIG. 11 is a flowchart illustrating a method for receiving control information by a reception apparatus according to an embodiment of the present invention.

Referring to FIG. 11, in step 1100, the reception apparatus receives the L1 signaling information of the current frame. In step 1102, the reception apparatus acquires at least one of the number of bits of the L1-post signaling information, the number of coded blocks, and the number of PLPs, which are transmitted in the current frame. Herein, the reception apparatus may receive the number of bits of the L1-post signaling information or the number of coded blocks from the transmission apparatus, or may use previously-determined information. This option may be changed according to a user of a system. In addition, although L1-pre information is also received in step 1100, the present invention is directed to L1-post signaling information, and L1-pre information is processed by a scheme performed by a broadcasting/communication system to which the present invention is applied. Therefore, a more detailed description of the L1-pre information will be omitted.

In step 1104, the reception apparatus decodes the received coded blocks. In step 1106, the reception apparatus extracts segmented L1-post signaling information bits included in each of the decoded coded blocks, and in step 1008, the reception apparatus reassembles the L1-post signaling information bits extracted in step 1106 in order to return to a state before being segmented.

In step 1110, the reception apparatus receives data using the L1-post signaling information bits reassembled in step 1108 and L1 signaling information other than the L1-post signaling information received in step 1100.

In step 1112, the reception apparatus moves to the next frame, and repeats the operation in steps 1100 to 1110 for the next frame.

Figure 12:
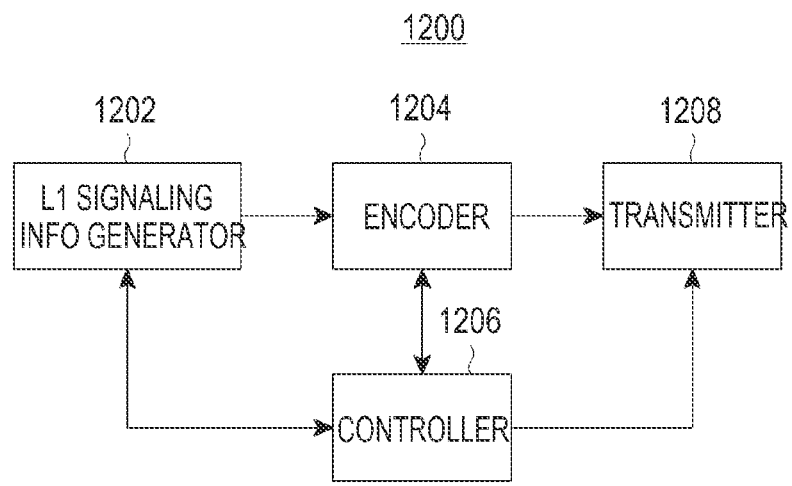
FIG. 12 is a block diagram illustrating a transmission apparatus according to an embodiment the present invention.

FIG. 12 is a block diagram illustrating a transmission apparatus 1200 according to an embodiment of the present invention.

Referring to FIG. 12, an L1 signaling information generator 1202 generates L1 signaling information of a current frame. Specifically, the L1 signaling information generator 1202 generates L1-pre information and L1-post signaling information, and outputs the generated L1-pre information and the generated L1-post signaling information to an encoder 1204. However, because the present invention relates to encoding of L1-post signaling information, and L1-pre information is encoded by the broadcasting/communication system to which the present invention is applied, the L1-pre information will not be described in more detail herein.

A controller 1206 determines the number of bits of the L1-post signaling information, excluding a padding field, generated by the L1 signaling information generator 1202. The controller 1206 determines a number of coded blocks to be used to transmit L1-post signaling bits based on the determined number of bits of the L1-post signaling information, excluding the padding field and an encoding unit. Also, the controller 1206 may determine the number of PLPs.

When the controller 1206 determines the number of coded blocks, it segments the L1-post signaling information according to the determined number of coded blocks. Further, when the encoder 1204 includes an interleaver, the controller 1206 controls the interleaver to segment the L1-post signaling information. Otherwise, the controller 1206 may control the L1 signaling information generator 1202 to segment the L-post signaling information. The segmentation scheme may use the above-described equations.

More specifically, the controller 1206 first calculates the number of padding bits corresponding to a correction factor for each of multiple pieces of information (bits of L1 configurable information, bits of L1 dynamic information of the current frame, bits of L1 dynamic information of the next frame, and bits of CRC and an extension field). The controller then obtains the number of all padding bits of the L1-post signaling by adding the first to fourth calculated numbers of padding bits of the multiple pieces of information. The controller calculates the number of all bits of the L1-post signaling using the obtained number of padding bits of the L1-post signaling and the number of bits of the L1-post signaling information, excluding the determined padding field. The number of input bits required per coded block may be obtained by dividing the calculated number of bits of the L1-post signaling by the determined number of coded blocks. In other words, encoding is perform by inputting as many L1-post signaling bits as the obtained number of input bits to the encoder.

The controller performs a control operation to segment the multiple pieces of information (bits of the L1 configurable information, bits of the L1 dynamic information of the current frame, bits of the L1 dynamic information of the next frame, and bits of the CRC and the extension field) according to the determined number of coded blocks, and to construct input bits for code blocks, each having a length corresponding to the obtained number of input bits. The number of groups of the constructed input bits for code blocks is equal to the determined number of coded blocks.

The controller 1206 controls the encoder 1204 or the L1 signaling information generator 1202 to include the segmented L1-post signaling information in each of first encoder input information bits to $(N_{post\_FEC\_Block})^{th}$ encoder input information bits. The encoder 1204 first encodes the first encoder input information bits to the $(N_{post\_FEC\_Block})^{th}$ encoder input information bits, and then outputs a first coded block to an $(N_{post\_FEC\_Block})^{th}$ coded block to a transmitter 1208. The transmitter 1208 transmits the coded blocks to a reception apparatus on a frame-by-frame basis according to the control of the controller 1206. Additionally, the transmitter 1208 may transmit the number of PLPs, which has been determined by the controller 1206, to the reception apparatus.

Figure 13:
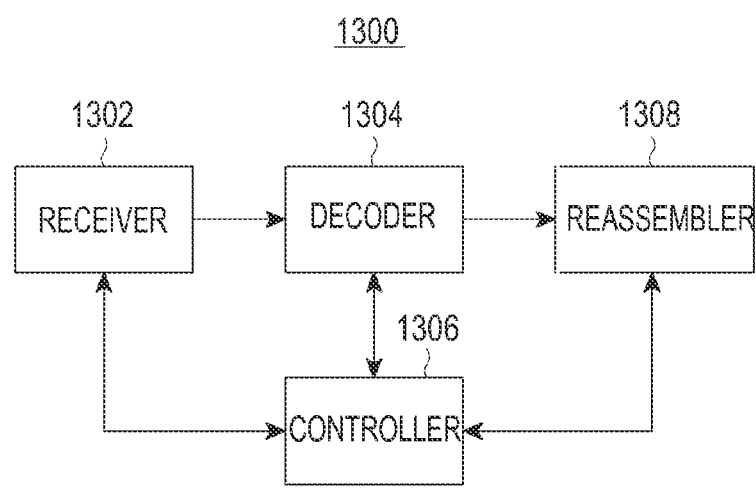
FIG. 13 is a block diagram illustrating a reception apparatus according to an embodiment the present invention.

FIG. 13 is a block diagram illustrating a reception apparatus 1300 according to an embodiment of the present invention.

Referring to FIG. 13, a receiver 1302 receives the L1 signaling information of the current frame, and outputs the received L1 signaling information of the current frame to a decoder 1304. Also, the receiver 1302 receives at least one of the number of bits of the L1-post signaling information, the number of coded blocks, and the number of PLPs, which are transmitted in the current frame, and outputs the received data to a controller 1306. Herein, the controller 1306 may receive the number of bits of the L1-post signaling information, the number of coded blocks, or the number of PLPs from the transmission apparatus, or may use previously-determined information. This option may be changed according to a user of a system. In addition, although the receiver 1302 also receives L1-pre information, because the present invention is directed to L1-post signaling information, and L1-pre information is processed by a scheme performed by a broadcasting/communication system to which the present invention is applied, a more detailed description of the L1-pre information will be omitted.

The decoder 1304 decodes the received coded blocks.

According to an embodiment of the present invention, the controller 1306 performs a control operation for extracting segmented L1-post signaling information bits included in each of the decoded coded blocks. A reassembler 1308 reassembles the L1-post signaling information bits extracted according to the control of the controller 1306, in order to return to a state before being segmented. Namely, the controller 1306 calculates a segmentation value by using one of one of the number of bits of the L1-post signaling information, the number of coded blocks and the number of PLPs, and notifies the calculated segmentation value to the reassembler 1308. Accordingly, the controller 1306 enables the restoration of the original L1-post signaling information by reversely performing the process performed by the transmission apparatus.

The controller 1306 controls the receiver 1302 to receive data using the reassembled L1-post signaling information bits and L1 signaling information other than the L1-post signaling information.

As described above, although L1 configurable information and L1 dynamic information are referred to as "L1-post signaling information," this designation is a term used when the present invention is applied to DVB-T2 (Digital Video Broadcasting Terrestrial 2). Accordingly, when the present invention is applied to DVB-C2 (Digital Video Broadcasting Cable 2), the L1 configurable information and the L1 dynamic information may also be referred to as "part II signaling information."

Additionally, the above-described embodiments of the present invention may also be implemented as codes, which can be recorded by a computer, in a non-transitory computer-recordable recording medium.

For example, the computer-recordable recording medium may be an optional data storage device, which can store data that can be read by a computer system.

Examples of non-transitory computer-recordable recording mediums include a Read Only Memory (ROM), a Random Access Memory (RAM), a Compact Disk (CD), a magnetic tape, a floppy disk, and an optical data storage device. However, the present invention is not limited to these examples.

According to the above-described embodiments of the present invention, a transmitter encodes control information to efficiently change the control information, such that a receiver can improve decoding performance.

While the present invention has been shown and described with reference to certain embodiments thereof, it will be understood by those skilled in the art that various changes in form and details may be made therein without departing from the spirit and scope of the invention. Therefore, the spirit and scope of the present invention is not limited to the described embodiments thereof, but is defined by the appended claims and their equivalents.

What is claimed is:

1. A method for transmitting signaling information by a transmitter in a broadcasting/communication system, the method comprising:
generating the signaling information which comprises a plurality of pieces;
determining a number of coded blocks to which the signaling information is to be encoded, based on a number of bits of the signaling information;
segmenting each piece of the signaling information based on the number of the coded blocks;
constructing input information bits of each coded block to include segmented parts of each piece of the signaling information;
encoding the input information bits to each coded block; and
transmitting each coded block.

2. The method of claim 1, wherein the signaling information includes layer 1 (L1) configurable information and L1 dynamic information.

3. The method of claim 2, wherein the L1 dynamic information includes L1 dynamic information of a current frame and L1 dynamic information of a next frame.

4. The method of claim 2, wherein the signaling information further includes at least one of an extension field, a Cyclic Redundancy Check (CRC) field, and a padding field.

5. The method of claim 4, wherein a length of the padding field is defined by:

$$K_{L1\_PADDING} = K_{L1\_conf\_PAD} + K_{L1\_dyn,c\_PAD} + K_{L1\_dyn,n\_PAD} + K_{L1\_ext\_PAD},$$

wherein $K_{L1\_PADDING}$ represents the length of the padding field, $K_{L1\_conf\_PAD}$ represents a length of a padding field of the L1 configurable information, $K_{L1\_dyn,c\_PAD}$ represents a length of a padding field of L1 dynamic information of a current frame, $K_{L1\_dyn,n\_PAD}$ represents a length of a padding field of L1 dynamic information of a next frame, and $K_{L1\_ext\_PAD}$ represents a length of a padding field of the extension field including the CRC.

6. The method of claim 5, wherein $K_{L1\_conf\_PAD}$, is defined by:

$$K_{L1\_conf\_PAD} = \left\lceil \frac{K_{L1\_conf}}{N_{post\_FEC\_Block}} \right\rceil \times N_{post\_FEC\_Block} - K_{L1\_conf},$$

wherein $K_{L1\_dyn,c\_PAD}$ is defined by:

$$K_{L1\_dyn,c\_PAD} = \left\lceil \frac{K_{L1\_dyn,c}}{N_{post\_FEC\_Block}} \right\rceil \times N_{post\_FEC\_Block} - K_{L1\_dyn,c},$$

wherein $K_{L1\_dyn,n\_PAD}$ is defined by:

$$K_{L1\_dyn,n\_PAD} = \left\lceil \frac{K_{L1\_dyn,n}}{N_{post\_FEC\_Block}} \right\rceil \times N_{post\_FEC\_Block} - K_{L1\_dyn,n},$$

and
wherein $K_{L1\_ext\_PAD}$ is defined by:

$$K_{L1\_ext\_PAD} = \left\lceil \frac{K_{L1\_ext} + N_{crc}}{N_{post\_FEC\_Block}} \right\rceil \times N_{post\_FEC\_Block} - (K_{L1\_ext} + N_{crc}),$$

wherein $K_{L1\_conf}$ represents a length of the L1 configurable information, $K_{L1\_dyn,c}$ represents a length of the L1 dynamic information of the current frame, $K_{L1\_dyn,n}$ represents a length of the L1 dynamic information of the next frame, $K_{L1\_ext}$ represents a length of the extension field, $N_{crc}$ represents a length of the CRC field, and $N_{post\_FEC\_Block}$ represents the number of coded blocks.

7. The method of claim 1, wherein the number of the coded blocks is defined by:

$$N_{post\_FEC\_Block} = \begin{cases} \text{If} & K_{post\_ex\_pad} \leq K_{bch}, 1 \\ \text{Otherwise,} & \left\lceil \frac{K_{post\_ex\_pad}}{K_{bch} - A} \right\rceil \end{cases},$$

wherein $N_{post\_FEC\_Block}$ represents the number of coded blocks, $K_{post\_ex\_pad}$ represents a number of signaling bits, excluding a padding field, $K_{bch}$ corresponds to the encoding unit and represents a number of bits that an encoder encodes at one time unit, $K_{bch}$ represents a number of bose chaudhuri hocquenghem (BCH) information bits that are permitted to be input to a BCH encoder, when BCH encoding is concatenated with a low density parity check (LDPC) encoding, and A represents a correction factor.

8. The method of claim 1, wherein a length of the input information bits of each coded block is defined by:

$$K_{sig} = \frac{K_{post}}{N_{post\_FEC\_Block}},$$

wherein $K_{sig}$ represents the length of the input information bits of each coded block, $N_{post\_FEC\_Block}$ represents the number of coded blocks, and $K_{post}$ is defined by:

$$K_{post} = K_{post\_ex\_pad} + K_{L1\_PADDING},$$

wherein $K_{post\_ex\_pad}$ represents a number of signaling bits excluding a padding field, and $K_{L1\_PADDING}$ represents a length of the padding field.

9. An apparatus for transmitting signaling information in a broadcasting/communication system, the apparatus comprising:
a layer 1 (L1) signaling information generator for generating the signaling information which comprises a plurality pieces;
a controller for determining a number of coded blocks to which the signaling information is to be encoded, based on a number of bits of the signaling information;
an encoder for segmenting each piece of the signaling information based on the number of the coded blocks, constructing input information bits of each coded block to include segmented parts of each piece of the signaling information, and encoding the input information bits to each coded block; and
a transmitter for transmitting each encoded block.

10. The apparatus of claim 9, wherein the signaling information comprises L1 configurable information and L1 dynamic information.

11. The apparatus of claim 10, wherein the L1 dynamic information comprises L1 dynamic information of a current frame and L1 dynamic information of a next frame.

12. The apparatus of claim 10, wherein the signaling information further comprises at least one of an extension field, a Cyclic Redundancy Check (CRC) field, and a padding field.

13. The apparatus of claim 12, wherein a length of the padding field is defined by:

$$K_{L1\_PADDING} = K_{L1\_conf\_PAD} + K_{L1\_dyn,c\_PAD} + K_{L1\_dyn,n\_PAD} + K_{L1\_ext\_PAD},$$

wherein $K_{L1\_PADDING}$ represents the length of the padding field, $K_{L1\_conf\_PAD}$ represents a length of a padding field of the L1 configurable information, $K_{L1\_dyn,c\_PAD}$ represents a length of a padding field of L1 dynamic information of a current frame, $K_{L1\_dyn,n\_PAD}$ represents a length of a padding field of L1 dynamic information of a next frame, and $K_{L1\_ext\_PAD}$ represents a length of a padding field of the extension field including the CRC.

14. The apparatus of claim 13, wherein $K_{L1\_conf\_PAD}$, is defined by:

$$K_{L1\_conf\_PAD} = \left\lceil \frac{K_{L1\_conf}}{N_{post\_FEC\_Block}} \right\rceil \times N_{post\_FEC\_Block} - K_{L1\_conf},$$

wherein $K_{L1\_dyn,c\_PAD}$ is defined by:

$$K_{L1\_dyn,c\_PAD} = \left\lceil \frac{K_{L1\_dyn,c}}{N_{post\_FEC\_Block}} \right\rceil \times N_{post\_FEC\_Block} - K_{L1\_dyn,c},$$

wherein $K_{L1\_dyn,n\_PAD}$ is defined by:

$$K_{L1\_dyn,n\_PAD} = \left\lceil \frac{K_{L1\_dyn,n}}{N_{post\_FEC\_Block}} \right\rceil \times N_{post\_FEC\_Block} - K_{L1\_dyn,n},$$

and
wherein $K_{L1\_ext\_PAD}$ is defined by:

$$K_{L1\_ext\_PAD} = \left\lceil \frac{K_{L1\_ext} + N_{crc}}{N_{post\_FEC\_Block}} \right\rceil \times N_{post\_FEC\_Block} - (K_{L1\_ext} + N_{crc}),$$

wherein $K_{L1\_conf}$ represents a length of the L1 configurable information, $K_{L1\_dyn,c}$ represents a length of the L1 dynamic information of the current frame, $K_{L1\_dyn,n}$ represents a length of the L1 dynamic information of the next frame, $K_{L1\_ext}$ represents a length of the extension field, $N_{crc}$ represents a length of the CRC field, and $N_{post\_FEC\_Block}$ represents the number of coded blocks.

15. The apparatus of claim 9, wherein the controller determines the number of the coded blocks according to:

$$N_{post\_FEC\_Block} = \begin{cases} \text{If} & K_{post\_ex\_pad} \leq K_{bch}, 1 \\ \text{Otherwise,} & \left\lceil \frac{K_{post\_ex\_pad}}{K_{bch} - A} \right\rceil \end{cases},$$

wherein $N_{post\_FEC\_Block}$ represents the number of coded blocks, $N_{post\_ex\_pad}$ represents the number of signaling bits excluding a padding field, $K_{bch}$ corresponds to an encoding unit and represents the number of bits that an encoder encodes at one time, $K_{bch}$ represents the number of bose chaudhuri hocquenghem (BCH) information bits which are permitted to be input to a BCH encoder when BCH encoding concatenated with a low density parity check (LDPC) encoding is performed, and A represents a correction factor.

16. The apparatus of claim 9, wherein a length of the input information bits of each coded block defined by:

$$K_{sig} = \frac{K_{post}}{N_{post\_FEC\_Block}},$$

wherein $K_{sig}$ represents the length of the input information bits of each coded block, $N_{post\_FEC\_Block}$ represents the number of coded blocks, and $K_{post}$ is defined by:

$$K_{post} = K_{post\_ex\_pad} + K_{L1\_PADDING},$$

wherein $K_{post\_ex\_pad}$ represents a number of signaling bits excluding a padding field, and $K_{L1\_PADDING}$ represents a length of the padding field.

17. A method for receiving signaling information by a receiver in a broadcasting/communication system, the method comprising:
receiving coded blocks of the signaling information, wherein a number of the coded blocks is determined based on a number of bits of the signaling information, wherein each piece of the signaling information is segmented based on the number of the coded blocks;
acquiring the number of bits of the signaling information or the number of the coded blocks of the signaling information;
decoding the coded blocks; and
restoring each piece of the signaling information using segmented parts of each piece of signaling information bits included in the decoded coded blocks.

18. The method of claim 17, wherein the signaling information comprises layer 1 (L1) configurable information and L1 dynamic information.

19. The method of claim 18, wherein the L1 dynamic information includes L1 dynamic information of a current frame and L1 dynamic information of a next frame.

20. The method of claim 18, wherein the signaling information further includes at least one of an extension field, a Cyclic Redundancy Check (CRC) field, and a padding field.

21. The method of claim 20, wherein a length of the padding field is defined by:

$$K_{L1\_PADDING} = K_{L1\_conf\_PAD} + K_{L1\_dyn,c\_PAD} + K_{L1\_dyn,n\_PAD} + K_{L1\_ext\_PAD},$$

wherein $K_{L1\_PADDING}$ represents the length of the padding field, $K_{L1\_conf\_PAD}$ represents a length of a padding field of the L1 configurable information, $K_{L1\_dyn,c\_PAD}$ represents a length of a padding field of L1 dynamic information of a current frame, $K_{L1\_dyn,n\_PAD}$ represents a length of a padding field of L1 dynamic information of a next frame, and $K_{L1\_ext\_PAD}$ represents a length of a padding field of the extension field including the CRC.

22. The method of claim 21, wherein $K_{L1\_conf\_PAD}$ is defined by:

$$K_{L1\_conf\_PAD} = \left\lceil \frac{K_{L1\_conf}}{N_{post\_FEC\_Block}} \right\rceil \times N_{post\_FEC\_Block} - K_{L1\_conf},$$

wherein $K_{L1\_dyn,c\_PAD}$ is defined by:

$$K_{L1\_dyn,c\_PAD} = \left\lceil \frac{K_{L1\_dyn,c}}{N_{post\_FEC\_Block}} \right\rceil \times N_{post\_FEC\_Block} - K_{L1\_dyn,c},$$

wherein $K_{L1\_dyn,n\_PAD}$ is defined by:

$$K_{L1\_dyn,c\_PAD} = \left\lceil \frac{K_{L1\_dyn,n}}{N_{post\_FEC\_Block}} \right\rceil \times N_{post\_FEC\_Block} - K_{L1\_dyn,n},$$

and
wherein $K_{L1\_ext\_PAD}$ is defined by:

$$K_{L1\_ext\_PAD} = \left\lceil \frac{K_{L1\_ext} + N_{crc}}{N_{post\_FEC\_Block}} \right\rceil \times N_{post\_FEC\_Block} - (K_{L1\_ext} + N_{crc}),$$

wherein $K_{L1\_conf}$ represents a length of the L1 configurable information, $K_{L1\_dyn,c}$ represents a length of the L1 dynamic information of the current frame, $K_{L1\_dyn,n}$ represents a length of the L1 dynamic information of the next frame, $K_{L1\_ext}$ represents a length of the extension field, $N_{crc}$ represents a length of the CRC field, and $N_{post\_FEC\_Block}$ represents the number of coded blocks.

23. The method as claimed in claim 17, wherein, in acquiring of the number of the coded blocks of the signaling information, the number of the coded blocks is defined by:

$$N_{post\_FEC\_Block} = \begin{cases} \text{If} & K_{post\_ex\_pad} \leq K_{bch}, 1 \\ \text{Otherwise,} & \left\lceil \frac{K_{post\_ex\_pad}}{K_{bch} - A} \right\rceil \end{cases},$$

wherein $N_{post\_FEC\_Block}$ represents the number of coded blocks, $K_{post\_ex\_pad}$ represents the number of signaling bits excluding a padding field, $K_{bch}$ corresponds to an encoding unit and represents the number of bits that an encoder encodes at one time, $K_{bch}$ represents the number of bose chaudhuri hocquenghem (BCH) information bits which are permitted to be input to a BCH encoder when BCH encoding concatenated with a low density parity check (LDPC) encoding is performed, and A represents a correction factor.

24. The method of claim 17, wherein a length of segmented signaling information of each coded block is defined by:

$$K_{sig} = \frac{K_{post}}{N_{post\_FEC\_Block}},$$

wherein $K_{sig}$ represents the length of the input information bits of each coded block, $N_{post\_FEC\_Block}$ represents the number of coded blocks, and $K_{post}$ is defined by:

$$K_{post} = K_{post\_ex\_pad} + K_{L1\_PADDING},$$

wherein $N_{post\_ex\_pad}$ represents a number of signaling bits excluding a padding field, and $K_{L1\_PADDING}$ represents a length of the padding field.

25. An apparatus for receiving signaling information in a broadcasting/communication system, the apparatus comprising:
a receiver for receiving coded blocks of the signaling information, wherein a number of the coded blocks is determined based on a number of bits of the signaling information, wherein each piece of the signaling information is segmented based on the number of the coded blocks;
a decoder for decoding the coded blocks; and
a controller for acquiring the number of bits of the signaling information or the number of the coded blocks of the signaling information, and restoring each piece of the signaling information using segmented parts of each piece of signaling information bits included in the decoded coded blocks.

26. The apparatus of claim 25, wherein the signaling information comprises layer 1 (L1) configurable information and L1 dynamic information.

27. The apparatus of claim 26, wherein the L1 dynamic information comprises L1 dynamic information of a current frame and L1 dynamic information of a next frame.

28. The apparatus of claim 26, wherein the signaling information further comprises at least one of an extension field, a Cyclic Redundancy Check (CRC) field, and a padding field.

29. The apparatus of claim 28, wherein a length of the padding field is defined by:

$$K_{L1\_PADDING} = K_{L1\_conf\_PAD} + K_{L1\_dyn,c\_PAD} + K_{L1\_dyn,n\_PAD} + K_{L1\_ext\_PAD},$$

wherein $K_{L1\_PADDING}$ represents the length of the padding field, $K_{L1\_conf\_PAD}$ represents a length of a padding field of the L1 configurable information, $K_{L1\_dyn,c\_PAD}$ represents a length of a padding field of L1 dynamic information of a current frame, $K_{L1\_dyn,n\_PAD}$ represents a length of a padding field of L1 dynamic information of a next frame, and $K_{L1\_ext\_PAD}$ represents a length of a padding field of the extension field including the CRC.

30. The apparatus of claim 29, wherein $K_{L1\_conf\_PAD}$ is defined by:

$$K_{L1\_conf\_PAD} = \left\lceil \frac{K_{L1\_conf}}{N_{post\_FEC\_Block}} \right\rceil \times N_{post\_FEC\_Block} - K_{L1\_conf},$$

wherein $K_{L1\_dyn,c\_PAD}$ is defined by:

$$K_{L1\_dyn,c\_PAD} = \left\lceil \frac{K_{L1\_dyn,c}}{N_{post\_FEC\_Block}} \right\rceil \times N_{post\_FEC\_Block} - K_{L1\_dyn,c},$$

wherein $K_{L1\_dyn,n\_PAD}$ is defined by:

$$K_{L1\_dyn,c\_PAD} = \left\lceil \frac{K_{L1\_dyn,n}}{N_{post\_FEC\_Block}} \right\rceil \times N_{post\_FEC\_Block} - K_{L1\_dyn,c},$$

and
wherein $K_{L1\_ext\_PAD}$ is defined by:

$$K_{L1\_ext\_PAD} = \left\lceil \frac{K_{L1\_ext} + N_{crc}}{N_{post\_FEC\_Block}} \right\rceil \times N_{post\_FEC\_Block} - (K_{L1\_ext} + N_{crc}),$$

wherein $K_{L1\_conf}$ represents a length of the L1 configurable information, $K_{L1\_dyn,c}$ represents a length of the L1 dynamic information of the current frame, $K_{L1\_dyn,n}$ represents a length of the L1 dynamic information of the next frame, $K_{L1\_ext}$ represents a length of the extension field, $N_{crc}$ represents a length of the CRC field, and $N_{post\_FEC\_Block}$ represents the number of coded blocks.

31. The apparatus as claimed in claim 25, wherein the controller acquires the number of the coded blocks according to:

$$N_{post\_FEC\_Block} = \begin{cases} \text{If} & K_{post\_ex\_pad} \leq K_{bch}, 1 \\ \text{Otherwise,} & \left\lceil \frac{K_{post\_ex\_pad}}{K_{bch} - A} \right\rceil \end{cases},$$

wherein $N_{post\_FEC\_Block}$ represents the number of coded blocks, $K_{post\_ex\_pad}$ represents the number of signaling bits excluding a padding field, $K_{bch}$ corresponds to an encoding unit and represents the number of bits that an encoder encodes at one time, $K_{bch}$ represents the number of bose chaudhuri hocquenghem (BCH) information bits which are permitted to be input to a BCH encoder when BCH encoding concatenated with a low density parity check (LDPC) encoding is performed, and A represents a correction factor.

32. The apparatus of claim 25, wherein a length of segmented signaling information of each coded block is defined by:

$$K_{sig} = \frac{K_{post}}{N_{post\_FEC\_Block}},$$

wherein $K_{sig}$ represents the length of the input information bits of each coded block, $N_{post\_FEC\_Block}$ represents the number of coded blocks, and $K_{post}$ is defined by:

$$K_{post}=K_{post\_ex\_pad}+K_{L1\_PADDING},$$

wherein $K_{post\_ex\_pad}$ represents a number of signaling bits excluding a padding field, and $K_{L1\_PADDING}$ represents a length of the padding field.

* * * * *